US012764402B2

(12) United States Patent
Miller et al.

(10) Patent No.: US 12,764,402 B2
(45) Date of Patent: Oct. 13, 2026

(54) SENSOR SHIFT CAMERA MODULE WITH FIVE DEGREES OF FREEDOM

(71) Applicant: Apple Inc., Cupertino, CA (US)

(72) Inventors: Scott W Miller, Los Gatos, CA (US); Alfred N Mireault, San Francisco, CA (US); Vito Lisma, Munich (DE); Hao Zheng, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 324 days.

(21) Appl. No.: 18/469,419

(22) Filed: Sep. 18, 2023

(65) Prior Publication Data

US 2024/0107144 A1 Mar. 28, 2024

Related U.S. Application Data

(60) Provisional application No. 63/376,803, filed on Sep. 23, 2022.

(51) Int. Cl.
*H04N 5/335* (2011.01)
*H04N 23/54* (2023.01)

(52) U.S. Cl.
CPC .................................. *H04N 23/54* (2023.01)

(58) Field of Classification Search
CPC .................................................. H04N 23/687
See application file for complete search history.

(56) References Cited

U.S. PATENT DOCUMENTS 9,134,503 B2 9/2015 Topliss
9,578,217 B2 2/2017 Gutierrez et al.
9,578,218 B2 2/2017 Topliss
10,863,094 B2 * 12/2020 Sharma .................... G03B 5/00
10,890,734 B1 * 1/2021 Sharma ................ H02P 25/034
(Continued)

FOREIGN PATENT DOCUMENTS

CN 214591665 11/2021
KR 20230048191 4/2023
(Continued)

OTHER PUBLICATIONS

Korean Office Action from Korean Patent Application No. 10-2023-0127031, dated Sep. 26, 2025, pp. 1-7.
(Continued)

*Primary Examiner* — Gary C Vieaux
(74) *Attorney, Agent, or Firm* — Robert C. Kowert; Kowert, Hood, Munyon, Rankin & Goetzel, P.C

(57) ABSTRACT

An actuator assembly for a camera module includes a transversal actuator for motion of an image sensor in one or more directions orthogonal to an optical axis of the camera module. The actuator assembly also includes an axial actuator for motion of the image sensor in one or more directions parallel to the optical axis of the camera module. The actuator assembly further includes a shared magnet for operation of the transversal actuator for motion of the image sensor in the one or more directions orthogonal to the optical axis and for operation of the axial actuator for motion of the image sensor in one or more directions parallel to the optical axis. A portion of the transversal actuator and a portion of the axial actuator are configured to move with the image sensor. The shared magnet is static relative to motion of the image sensor.

20 Claims, 12 Drawing Sheets

(56) References Cited

U.S. PATENT DOCUMENTS

| | | | | |
|---|---|---|---|---|
| 11,223,765 | B2 | 1/2022 | Smyth | |
| 11,483,460 | B2 * | 10/2022 | Shahparnia | H04N 23/54 |
| 11,743,586 | B2 | 8/2023 | Smyth | |
| 2006/0017815 | A1 * | 1/2006 | Stavely | H04N 23/687 348/208.7 |
| 2006/0082659 | A1 | 4/2006 | Koo | |
| 2007/0279497 | A1 * | 12/2007 | Wada | H04N 23/687 348/208.99 |
| 2017/0155816 | A1 * | 6/2017 | Ito | H04N 23/687 |
| 2018/0367711 | A1 * | 12/2018 | Topliss | H04N 23/50 |
| 2019/0020822 | A1 * | 1/2019 | Sharma | G02B 27/646 |
| 2019/0141248 | A1 * | 5/2019 | Hubert | H02K 41/0356 |
| 2021/0168289 | A1 | 6/2021 | Hubert et al. | |
| 2021/0223563 | A1 * | 7/2021 | Miller | H04N 23/57 |
| 2021/0227142 | A1 * | 7/2021 | Sharma | H04N 23/6815 |
| 2021/0337121 | A1 | 10/2021 | Johnson et al. | |
| 2022/0221734 | A1 * | 7/2022 | Kim | H02K 41/0356 |

FOREIGN PATENT DOCUMENTS

| | | |
|---|---|---|
| KR | 20230151733 | 11/2023 |
| WO | 2023011224 | 2/2023 |

OTHER PUBLICATIONS

First Examination from India Patent Application No. 202314063690, dated May 13, 2026, pp. 1-7.

* cited by examiner

SENSOR SHIFT CAMERA MODULE WITH FIVE DEGREES OF FREEDOM

This application claims benefit of priority to U.S. Provisional Application Ser. No. 63/376,803, entitled "Sensor Shift Camera Module with Five Degrees of Freedom," filed Sep. 23, 2022, and which is hereby incorporated herein by reference in its entirety.

BACKGROUND

Technical Field

This disclosure relates generally to a sensor shift camera module for actuation on five axes.

Description of the Related Art

The advent of small, mobile multipurpose devices such as smartphones and tablet or pad devices has resulted in a need for high-resolution, small form factor cameras for integration in the devices. Some cameras may incorporate optical image stabilization (OIS) mechanisms that may sense and react to external excitation/disturbance by adjusting location of the optical lens and/or the image sensor on the X and/or Y axis in an attempt to compensate for unwanted motion of the lens. Furthermore, some cameras may incorporate an autofocus (AF) mechanism whereby the object focal distance can be adjusted to focus an object plane in front of the camera at an image plane to be captured by the image sensor. In some such AF mechanisms, the optical lens and/or the image sensor is moved as a single rigid body along the optical axis of the camera to refocus the camera.

BRIEF DESCRIPTION OF THE DRAWINGS

FIG. 1 shows an overhead perspective view of the exterior of the camera.

FIG. 2 shows a cross-sectional view of the camera across the A-A plane.

FIG. 3 shows an isometric perspective view of the camera.

Figure 1:
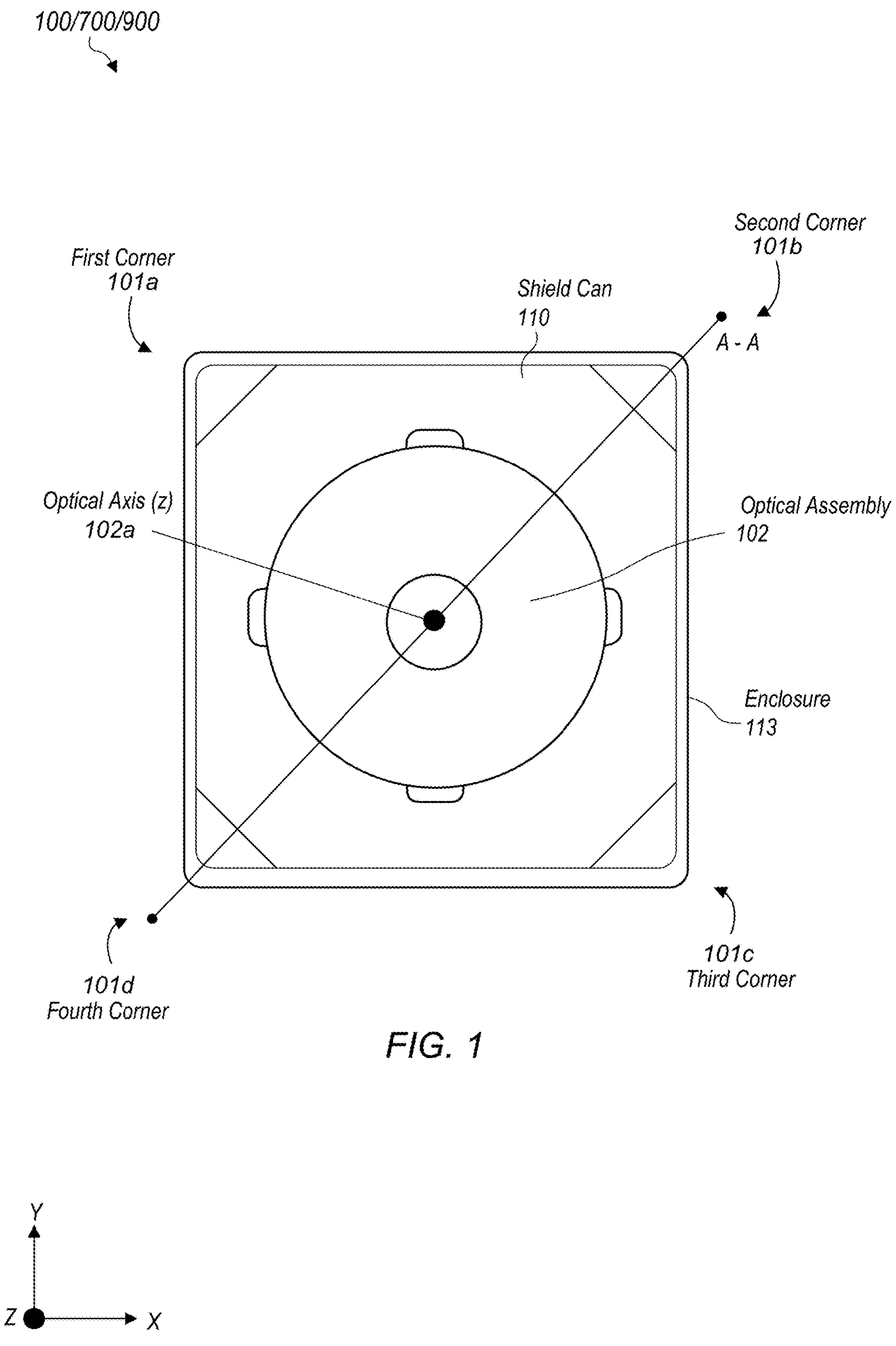
FIGS. 1, 2, and 3 illustrate components of an example camera having an actuator module or assembly that may, for example, be used to provide autofocus and/or optical image stabilization through image sensor movement in small form factor cameras, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values.

The terms “first” and “second” do not necessarily imply that the first value must be written before the second value.

“Based On.” As used herein, this term is used to describe one or more factors that affect a determination. This term does not foreclose additional factors that may affect a determination. That is, a determination may be solely based on those factors or based, at least in part, on those factors. Consider the phrase “determine A based on B.” While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms “a”, “an” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

As used herein, the term “if” may be construed to mean “when” or “upon” or “in response to determining” or “in response to detecting,” depending on the context. Similarly, the phrase “if it is determined” or “if [a stated condition or event] is detected” may be construed to mean “upon determining” or “in response to determining” or “upon detecting [the stated condition or event]” or “in response to detecting [the stated condition or event],” depending on the context.

DETAILED DESCRIPTION

Various embodiments described herein relate to an actuator assembly that may be used in a camera with a moveable image sensor. In some examples, the camera may include camera equipment outfitted with controls, magnets, flexures, and voice coil motors to improve the effectiveness of a miniature actuation mechanism for a compact camera module. More specifically, in some embodiments, compact camera modules include actuators to deliver functions such as autofocus (AF) and optical image stabilization (OIS). One approach to delivering a very compact actuator for OIS and AF is to use a Voice Coil Motor (VCM) arrangement.

In some embodiments, actuator assemblies may be used provide AF and/or OIS for a camera. In some aspects, an axial actuator may drive an optical assembly having one or more lenses in one or more directions parallel to an optical axis (e.g., z-direction(s)) to provide autofocus. A transversal actuator may drive an optical assembly and/or an image sensor in one or more directions orthogonal to an optical axis (e.g., x-direction(s), y-direction(s)) to provide OIS. As described herein, an actuator assembly (hereinafter the “actuator assembly”) includes at least one axial actuator (e.g., a plurality of axial actuators) and at least one transversal actuator (e.g., a plurality of transversal actuators) to drive an image sensor in five different ranges of motion for AF, OIS, tilt about the x-direction (e.g., angular motion), and/or tilt about the y-direction (e.g., angular motion).

The actuator assembly may include an axial actuator for motion of the image sensor in one or more directions parallel to an optical axis of the optical assembly (AF) and a transversal actuator for motion of the image sensor in one or more directions orthogonal to the optical axis of the optical assembly (OIS). In some aspects, the transversal actuators and/or the axial actuators may include voice coil motors (VCM) utilizing Lorentz forces to move the image sensor in one or more directions relative to a stationary structure of the camera. For example, the transversal actuators may include one or more transverse motion (OIS motion) VCMs and the axial actuators may include one or more axial motion (AF motion) VCMs. The actuator assembly may include a carrier mounted to the substrate and extending in a direction parallel with the optical axis. The carrier may retain a portion of the axial actuator. For example, the portion of the axial actuator retained by the carrier mounted to the substrate may include one or more AF coils.

A portion of the transversal actuator may also be mounted to the substrate. For example, the portion of the transversal actuator may include one or more OIS coils mounted to the substrate. In some aspects, the axial actuator and the transversal actuator may share one or more magnets. The magnets may be another portion of the axial actuator and another portion of the transversal actuator. A magnet holder may retain one or more magnets in a position adjacent to both the AF coils and the OIS coils. As shown herein, the magnet holder may be fixedly attached to an interior surface of the shield can (e.g., an upper portion of shield can adjacent the optical assembly and/or a side portion of the shield can) and retain (e.g., suspend) the magnet(s) so that the magnet(s) are in a position adjacent to the portion of the axial actuator and adjacent the portion of the transversal actuator. As such, the carrier and the magnet(s) may remain static while the image sensor, the portion of the axial actuator (e.g., the AF coils), and the portion of the transversal actuator (e.g., the OIS coils) move together in one or more directions as described herein.

When the one or more AF coils receive an electric current, a magnetic field produced by the one or more shared magnets may interact with the electrical current through the AF coils (e.g., Lorentz forces) to drive the image sensor in a direction parallel to the optical axis of the camera and/or in an angular direction about an axis orthogonal to the optical axis of the camera. In some aspects, when the one or more OIS coils receive an electric current, a magnetic field produced by the one or more shared magnets may interact with the electrical current through the OIS coils (e.g., Lorentz forces) to drive the image sensor in a direction orthogonal to the optical axis of the camera. In some instances, magnets as described herein may include bi-pole magnets. In some aspects, the magnets may include a pair of magnets in which a positive side of a first magnet faces towards the portion of the transversal actuator (e.g., the OIS coils) and a negative side of a second magnet faces towards the portion of the transversal actuator (e.g., the OIS coils).

Movement of the image sensor may be dampened using a flexure. A flexure may include a static platform, a dynamic platform, and a plurality of flexure arms. The static platform may be fixedly coupled to an enclosure at the lower side (e.g., opposite from the optical assembly) of the camera. In some aspects, the static platform may be fixedly attached to a base and the base may be fixedly attached to the enclosure at the lower side of the camera. The static platform may remain static relative to movement of the image sensor. The dynamic platform may be fixedly coupled to the image sensor. In some aspects, the dynamic platform may be fixedly attached to the substrate and the substrate may be fixedly attached to the image sensor. In some aspects, the dynamic platform may be fixedly attached to the substrate and the substrate may be fixedly attached to a ceramic layer, and the ceramic layer may be fixedly attached to the image sensor. The dynamic platform may move relative to the static platform. The flexure arms may mechanically attach the static platform to the dynamic platform. The flexure arms may permit and/or dampen movement of the dynamic platform (and therefore the image sensor) relative to the static platform (and therefore a remainder of the camera). For example, the flexure arms may dampen movement of the image sensor in one or more directions parallel to the optical axis and in one or more directions orthogonal to the optical axis. In some aspects, the flexure arms may dampen movement of the image sensor in one or more angular directions about an axis orthogonal to the optical axis. In some aspects, the flexure arms may include electrical traces that electrically couple the static platform with the dynamic platform. For instance, the electrical traces may communicate signal and power between one or more electronic components attached to the substrate (e.g., the image sensor) with one or more other electronic components coupled to a static location of the camera.

Additionally, or alternatively, movement of the image sensor may be dampened using a suspension structure. The suspension structure may couple the substrate to a static portion of the camera and dampen movement of the substrate (and thus the image sensor) relative to the static portion of the camera. In some aspects, the suspension structure may include a spring and a wire. The spring and the wire may be attached at one end to a static portion of the camera (e.g., the shield can). The spring may be attached to the carrier retaining the portion of the axial actuator (e.g., one or more AF coils). The wire may be attached to the substrate retaining the portion of the transversal actuator (e.g., one or more OIS coils). The spring may dampen movement of the image sensor in one or more directions parallel to the optical axis and the wire may dampen movement of the image sensor in one or more directions orthogonal to the optical axis. In some aspects, the spring and the wire may dampen movement of the image sensor in one or more angular directions about an axis orthogonal to the optical axis.

Additionally, or alternatively, movement of the image sensor may be dampened using another flexure. As previously discussed, a flexure may include a static platform, a dynamic platform, and a plurality of flexure arms. In this case, the static platform may be fixedly coupled to an enclosure at the upper side (e.g., the same side as the optical assembly) of the camera. In some aspects, the static platform may be fixedly attached to a shield can forming the upper side of the camera. The static platform may remain static relative to movement of the image sensor. The dynamic platform may be fixedly coupled to the image sensor. In some aspects, the dynamic platform may be fixedly attached to the carrier, the carrier may be fixedly attached to the substrate, and the substrate may be fixedly attached to the image sensor. In some aspects, the dynamic platform may be fixedly attached to the carrier, the carrier may be fixedly attached to the substrate, the substrate may be fixedly attached to a ceramic layer, and the ceramic layer may be fixedly attached to the image sensor. The dynamic platform may move relative to the static platform. The flexure arms may mechanically attach the static platform to the dynamic platform. The flexure arms may permit and/or dampen movement of the dynamic platform (and therefore the image sensor) relative to the static platform (and therefore a remainder of the camera). For example, the flexure arms may dampen movement of the image sensor in one or more directions parallel to the optical axis and in one or more directions orthogonal to the optical axis. In some aspects, the flexure arms may dampen movement of the image sensor in one or more angular directions about an axis orthogonal to the optical axis.

As described further herein, the actuator assembly may include a plurality of transversal actuators and a plurality of axial actuators with a portion of the respective transversal actuators attached to the substrate and a portion of the respective axial actuators retained by the carrier. For example, a portion of a first axial actuator of the plurality of axial actuators may be retained by the carrier and a portion of a second axial actuator of the plurality of axial actuators may also be retained by the carrier. Also, a portion of a first transversal actuator may be retained by the substrate and a portion of a second transversal actuator may also be retained by the substrate. The other portion of the first axial actuator may also be the other portion of the first transversal actuator. For example, the portion of the first axial actuator may include one or more AF coils and the portion of the first transversal actuator may include one or more OIS coils. The other portion of the first axial actuator and the other portion of the first transversal actuator may include one other portion adjacent both the first axial actuator and the first transversal actuator and shared by both the first axial actuator and the first transversal actuator. For example, the other portion of the first axial actuator and the other portion of the first transversal actuator may include one or more shared magnets (e.g., the same magnet(s)). The one or more shared magnets may be positioned adjacent both the portion of the first axial actuator and the portion of the first transversal actuator. The one or more AF coils of the portion of the first axial actuator may utilize the magnetic field from the one or more shared magnets to drive the image sensor in one or more directions parallel to the optical axis and the one or more OIS coils of the first transversal actuator may utilize the magnetic field from the same one or more shared magnets to drive the image sensor in one or more directions orthogonal to the optical axis.

Similarly, the other portion of the second axial actuator may also be the other portion of the second transversal actuator. For example, the portion of the second axial actuator may include one or more AF coils and the portion of the second transversal actuator may include one or more OIS coils. The other portion of the second axial actuator and the other portion of the second transversal actuator may include one other portion adjacent both the second axial actuator and the second transversal actuator and shared by both the second axial actuator and the second transversal actuator. For example, the other portion of the second axial actuator and the other portion of the second transversal actuator may include one or more shared magnets (e.g., the same magnet(s)). The one or more shared magnets may be positioned adjacent both the portion of the second axial actuator and the portion of the second transversal actuator. For example, the one or more AF coils of the portion of the second axial actuator may utilize the magnetic field from the one or more shared magnets to drive the image sensor in one or more directions parallel to the optical axis and the one or more OIS coils of the second transversal actuator may utilize the magnetic field from the same one or more shared magnets to drive the image sensor in one or more directions orthogonal to the optical axis.

In some aspects, the actuator assembly may include a plurality of axial actuators and a plurality of transversal actuators. The plurality of axial actuators and the plurality of transversal actuators may be positioned around or surrounding the image sensor. As shown herein, the plurality of axial actuators may include four axial actuators and the plurality of transversal actuators may include four transversal actuators. The four axial actuators and the four transversal actuators may be paired together such that a first axial actuator is paired with a first transversal actuator and shares a first set of one or more magnets, a second axial actuator is paired with a second transversal actuator and shares a second set of one or more magnets, a third axial actuator is paired with a third transversal actuator and shares a third set of one or more magnets, and a fourth axial actuator is paired with a fourth transversal actuator and shares a fourth set of one or more magnets. The respective paired axial actuators and transversal actuators may be positioned at or near corners of the substrate. For example, the substrate may include a rectangular shape (e.g., a square shape) and have four corners: a first corner, a second corner, a third corner, and a fourth corner. The first axial actuator paired with the first transversal actuator and sharing the first set of one or more magnets may be positioned at or near the first corner. The second axial actuator paired with the second transversal actuator and sharing the second set of one or more magnets may be positioned at or near the second corner. The third axial actuator paired with the third transversal actuator and sharing the third set of one or more magnets may be positioned at or near the third corner. The fourth axial actuator paired with the fourth transversal actuator and sharing the fourth set of one or more magnets may be positioned at or near the fourth corner.

Due to the plurality of axial actuators and the plurality of transversal actuators, axial movement of the image sensor, transversal movement of the image sensor, and/or tilt movement of the image sensor may be performed at the sensor level, by individual axial actuators or individual transversal actuators, and/or by a combination of one or more axial actuators and/or one or more transversal actuators. One or more axial actuators and/or one or more transversal actuators may operate to move the image sensor in one or more directions relative to the optical assembly. For example, all four axial actuators may activate to move the image sensor in a direction along the optical axis towards to the optical assembly or in a direction along the optical axis away from the optical assembly. In some aspects, one or more of the axial actuators (e.g., four axial actuators) may include position sensors (e.g., hall sensors) to detect movement and/or a change in position of the actuator assembly (and therefore of the image sensor) along the optical axis. As another example, one or more transversal actuators may activate to move the image sensor in a direction orthogonal to the optical axis. In some aspects, one or more of the transversal actuators (e.g., two transversal actuators) may include position sensors (e.g., hall sensors) to detect movement and/or a change in position of the transversal assembly (and therefore of the image sensor) in one or more directions orthogonal to the optical axis. As another example, one or more axial actuators may activate to tilt the image sensor in an angular direction about an axis that is orthogonal to the optical axis. For instances, axial actuators positioned in opposite corners from each other on the substrate may activate to tilt the image sensor. One axial actuator may activate to drive the image sensor in a direction parallel to the optical axis and towards the optical assembly and the other axial actuator may activate to drive the image sensor in another direction parallel to the optical axis and away from the optical assembly causing the image sensor to tilt about an axis orthogonal to the optical axis.

An actuator assembly integrated with one or more axial actuators and one or more transversal actuators may provide enhanced image stabilization with complex transversal, axial, rotational, and tilt correction and may endow the camera with ability to compensate for user handshake in five axes and for dynamic tilt. The actuator assembly with one or more axial actuators and one or more transversal actuators may provide posture compensation and may allow for improved coplanarity adjustment between the image sensor and the optical plane. While a dynamic optical assembly including AF may be used with the actuator assembly described herein, the actuator assembly may be alternatively used with a static optical assembly (e.g., fixed lens(es), glass lens(es), electrochromic lens(es)) so that more complex lens designs and additional variable aperture mechanism may be implemented in a camera module. In some case, implementing a static optical assembly enabled by the actuator assembly may omit a lens activate alignment step during model assembly. In addition, the angular compensation provided by the plurality of axial actuators and the plurality of transversal actuators may assist with reducing and/or cancelling module manufacturing residual tilt. In some aspects, the actuator assembly may have a higher frequency at a principal mode, and therefore has a higher bandwidth in disturbance rejection. The actuator assembly may provide no or reduced secondary image sensor motion (e.g., in the z-direction) due to at least one of the suspension assembly or the suspension structures (e.g., the top AF suspension structures, the bottom AF suspension structures). The actuator assembly may provide no increase in shoulder height (e.g., of the shield can) compared to other camera module designs. In some aspects, the actuator assembly may provide active control and dynamic tilt. In some aspects, the actuator assembly may provide tip tilt active suspension, gravity sag compensation. In some aspects, the actuator assembly may reduce particle ingress path and stray light risk.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Figure 2:
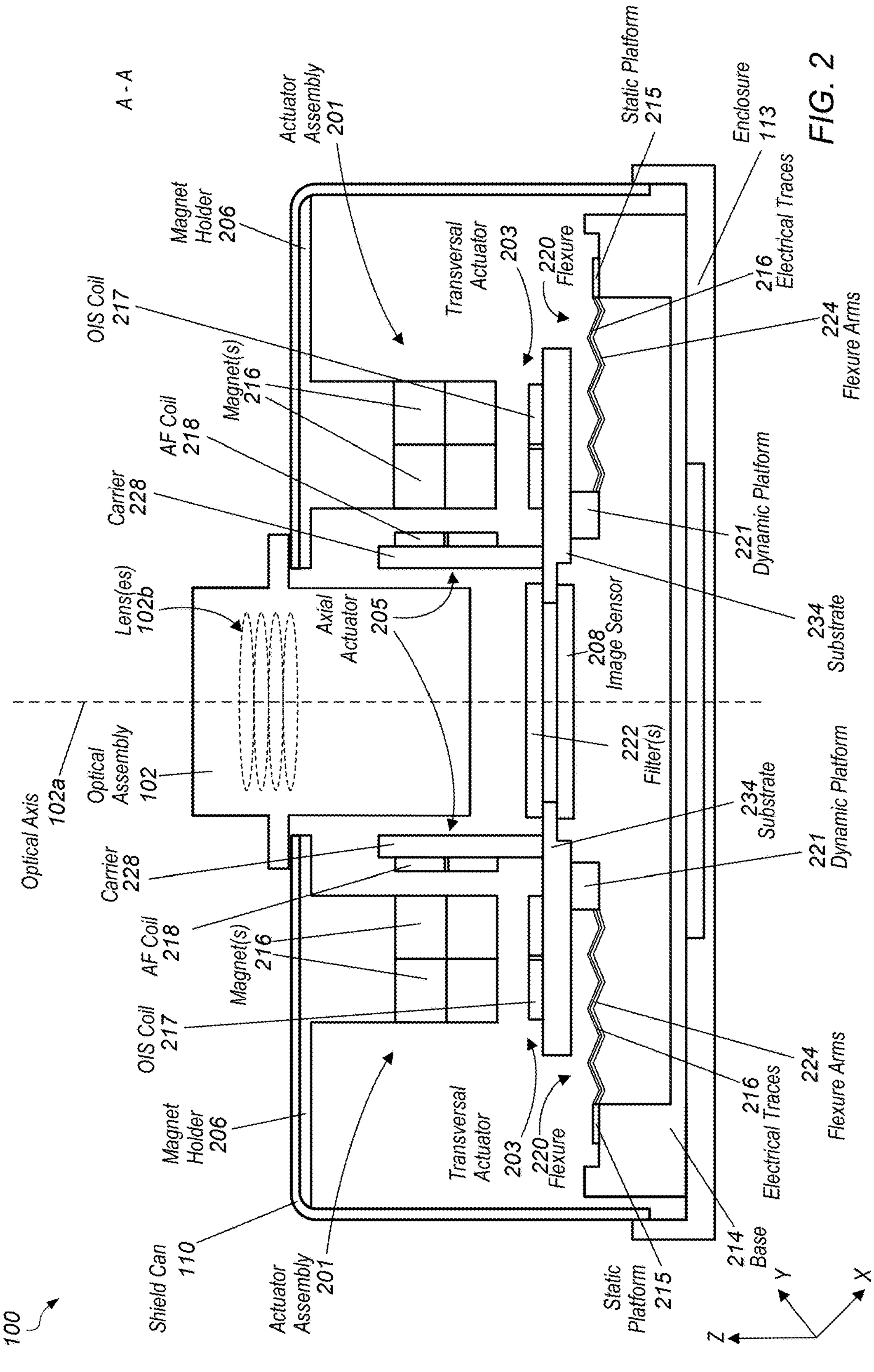
Figure 3:
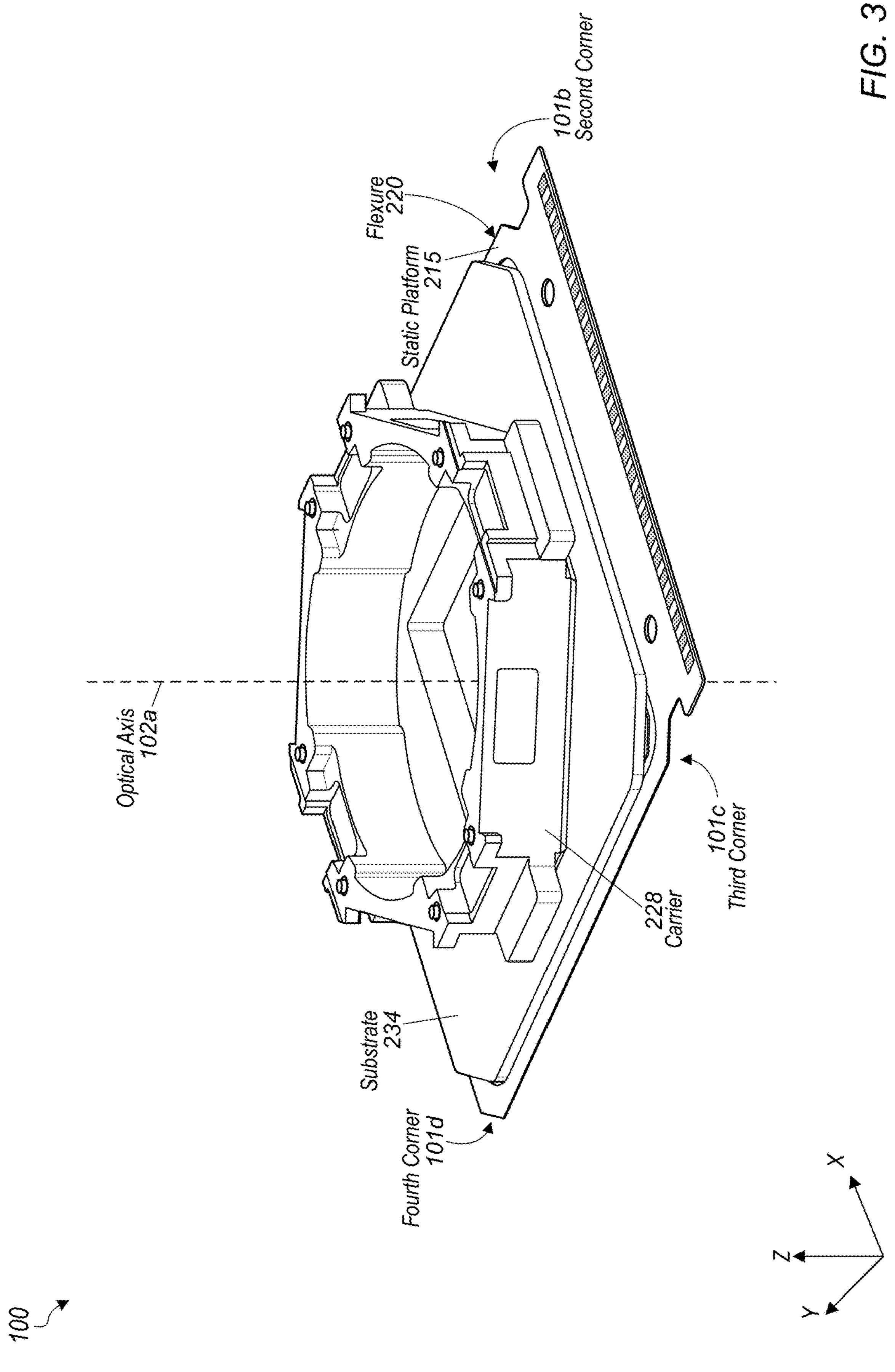

FIGS. 1, 2, and 3 illustrate components of an example camera 100 having an actuator module or assembly that may, for example, be used to provide autofocus and/or optical image stabilization through image sensor movement in small form factor cameras, according to at least some embodiments. FIG. 1 shows an overhead view of the exterior of the camera 100. The camera 100 illustrated in FIG. 1 may also be used to describe one or more components of the camera 700 illustrated in FIGS. 7 and 8 and one or more components of the camera 900 illustrated in FIGS. 9 and 10. FIG. 2 shows a cross-sectional view of the camera 100 across the A-A. FIG. 3 shows an isometric perspective view of the camera 100. The camera 100 may include one or more same or similar features as the features described with respect to or illustrated in FIGS. 4, 5, 6, 7, 8, 9, 10, 11, and 12. The example X-Y-Z coordinate system shown in FIGS. 1, 2, and 3 is used to discuss aspects of components and/or systems, and may apply to embodiments described throughout this disclosure.

In various embodiments, the camera 100 may include an optical assembly 102 having one or more lenses 102*b* defining an optical axis 102*a*, a first corner 101*a*, a second corner 101*b*, a third corner 101*c*, a fourth corner 101*d*, a flexure 220, an actuator assembly 201, a shield can 110, a substrate 234 (e.g., an OIS FPC, printed circuit board, and/or the like), filter(s) 222, an image sensor 208, a base 214, and an enclosure 113. The flexure 220 may be connected to a bottom surface of the base 214. In some examples, the base 214 may define one or more recesses and/or openings having multiple different cross-sections. For instance, a lower portion of the base 214 and/or an upper portion of the base 214 may define a recess and/or an opening with a cross-section sized to receive the flexure 220. The shield can 110 may be mechanically attached to the base 214. The shield can 110 may be mechanically coupled to the base 214 via the enclosure 113 attached to both the shield can 110 and the base 214.

The flexure 220 may include a dynamic platform 221, a static platform 215, and a plurality of flexure arms 224. The plurality of flexure arms 224 may provide a flexible mechanical coupling between the static platform 215 and the dynamic platform 221. For example, the flexure arms 224 may allow the dynamic platform 221 to move in one or more directions orthogonal to the optical axis 102*a* relative to the static platform 215 (e.g., a remainder of the camera 100) using one or more transversal actuators 203 and may allow the dynamic platform 221 to move in one or more directions parallel to or along the optical axis 102*a* relative to the static platform 215 (e.g., a remainder of the camera 100) using one or more axial actuators 205. Additionally, the flexure arms 224 may allow the dynamic platform 221 to move in one or more angular directions about one or more axes orthogonal to the optical axis 102*a* relative to the static platform 215 (e.g., a remainder of the camera 100) using one or more axial actuators 205. In some aspects, the flexure arms 224 may include electrical traces 216 for communicating electrical power and electrical signals between the dynamic platform 221 (e.g., one or more electronic components (e.g., electronic components 239) mounted on the substrate 234, the image sensor 208 mounted on the substrate 234, one or more electronic components mounted to the dynamic platform 221, or the like) and the static platform 215. The static platform 215 may be in electrical communication with one or more other components of the camera 100, via an electrical connection, for performing one or more camera operations.

In some non-limiting examples, the image sensor 208 may be attached to or otherwise integrated into the substrate 234, such that the image sensor 208 is connected to the OIS frame or flexure 220 via the substrate 234. For example, the dynamic platform 221 may retain the substrate 234 for mounting one or more electronic components 239 and/or the image sensor 208. The substrate 234 may include an opening with a cross-section sized to permit light to pass therethrough while also receiving or retaining the filter(s) 222 and the image sensor 208. An upper surface of a top layer of the substrate 234 may retain the filter(s) 222 around a perimeter of the opening and a lower surface of a lower layer of the substrate 234 may retain the image sensor 208 around the perimeter of the opening. In some aspects, a ceramic layer beneath the lower layer of the substrate 234 may couple the image sensor 208 to the substrate 234. In some aspects, the lower layer of the substrate 234 may include a ceramic material that may couple the image sensor 208 to the substrate 234. With the lower surface of the lower layer of the substrate 234 retaining the image sensor 208 around the perimeter of the opening, the image sensor 208 may be connected (e.g., mechanically and/or electrically) to the flexure 220 via the substrate 234. This configuration may allow the substrate 234 to retain the image sensor 208 (and the filter(s) 222) while also allowing light to pass from the lens(es) of the optics assembly 102, through the filter(s) 222, and be received by the image sensor 208 for image capturing. In other embodiments, the substrate 234 and the image sensor 208 may be separately attached to the OIS frame or flexure 220. For instance, a first set of one or more electrical traces 216 may be routed between the substrate 234 and the OIS frame or flexure 220. A second, different set of one or more electrical traces 216 may be routed between the image sensor 208 and the OIS frame or flexure 220. In some aspects, an AF coil may be integrated or embedded within the substrate 234.

As described herein, the actuator assembly 201 (hereinafter the "actuator assembly") may include at least one axial actuator 205 (e.g., a plurality of axial actuators) and at least one transversal actuator 203 (e.g., a plurality of transversal actuators) to drive an image sensor in five different ranges of motion for AF, OIS, tilt about the x-direction (e.g., angular motion), and/or tilt about the y-direction (e.g., angular motion). The actuator assembly 201 may include an axial actuator 205 for motion of the image sensor 208 in one or more directions parallel to an optical axis 102*a* of the optical assembly 102 (AF) and a transversal actuator 203 for motion of the image sensor 208 in one or more directions orthogonal to the optical axis 102*a* of the optical assembly 102 (OIS). In some aspects, the transversal actuators 203 and/or the axial actuators 205 may include voice coil motors (VCM) utilizing Lorentz forces to move the image sensor 208 in one or more directions relative to a stationary structure of the camera 100. For example, the transversal actuators 203 may include one or more transverse motion (OIS motion) VCMs and the axial actuators 205 may include one or more axial motion (AF motion) VCMs. The actuator assembly 102 may include a carrier 228 mounted to the substrate 234 and extending in a direction parallel with the optical axis 102*a*, as shown in FIG. 3. The carrier 228 may retain a portion of the axial actuator 205. For example, the portion of the axial actuator 205 retained by the carrier 228 mounted to the substrate 234 may include one or more AF coils 218. A portion of the transversal actuator 203 may also be mounted to the substrate 234. For example, the portion of the transversal actuator 203 may include one or more OIS coils 217 mounted to the substrate 234.

In some aspects, the axial actuator 205 and the transversal actuator 203 may share one or more magnets 216. The magnet(s) 216 may be another portion of the axial actuator 205 and another portion of the transversal actuator 203. A magnet holder 206 may retain the one or more magnets 216 in a position adjacent to both the AF coils 218 and the OIS coils 217. As shown in FIG. 2, the magnet holder 206 may be fixedly attached to an interior surface of the shield can 110 (e.g., an upper portion of shield can 110 adjacent the optical assembly 102 and/or a side portion of the shield can 110) and retain (e.g., suspend) the magnet(s) 216 so that the magnet(s) 216 are in a position adjacent to the portion of the axial actuator 205 and adjacent to the portion of the transversal actuator 203. As such, the carrier 228 and the magnet(s) 216 may remain static while the image sensor 208, the portion of the axial actuator (e.g., the AF coils 218), and the portion of the transversal actuator (e.g., the OIS coils 217) move together in one or more directions as described herein. When the one or more AF coils 218 receive an electric current, a magnetic field produced by the one or more magnet(s) 216 may interact with the electrical current through the AF coils 218 (e.g., Lorentz forces) to drive the image sensor 208 in a direction parallel to the optical axis 102*a* of the camera 100 and/or in an angular direction about an axis orthogonal to the optical axis 102*a* of the camera 100. In some aspects, when the one or more OIS coils 217 receive an electric current, a magnetic field produced by the one or more magnet(s) 216 may interact with the electrical current through the OIS coils 217 (e.g., Lorentz forces) to drive the image sensor 208 in a direction orthogonal to the optical axis 102*a* of the camera 100. In some instances, the magnet(s) 216 as described herein may include bi-pole magnets. In some aspects, the magnet(s) 216 may include a pair of magnets in which a positive side of a first magnet faces towards the portion of the transversal actuator (e.g., the OIS coils 217) and a negative side of a second magnet faces towards the portion of the transversal actuator (e.g., the OIS coils 217).

The flexure 220 may dampen movement of the image sensor 208. As described herein, the flexure 220 may include a static platform 215, a dynamic platform 221, and a plurality of flexure arms 224. The static platform 215 may be fixedly coupled to the 113 enclosure at the lower side (e.g., opposite from the optical assembly) of the camera 100. In some aspects, the static platform 215 may be fixedly attached to the base 214 and the base 214 may be fixedly attached to the enclosure 113 at the lower side of the camera 100. The static platform 215 may remain static relative to movement of the image sensor 208. The dynamic platform 221 may be fixedly coupled to the image sensor 208. In some aspects, the dynamic platform 221 may be fixedly attached to the substrate 234 and the substrate 234 may be fixedly attached to the image sensor 208. In some aspects, the dynamic platform 221 may be fixedly attached to the substrate 234, the substrate 234 may be fixedly attached to a ceramic layer, and the ceramic layer may be fixedly attached to the image sensor 208. The dynamic platform 221 may move relative to the static platform 215. The flexure arms 224 may mechanically attach the static platform 215 to the dynamic platform 221. The flexure arms 224 may permit and/or dampen movement of the dynamic platform 221 (and therefore the image sensor 208) relative to the static platform 215 (and therefore a remainder of the camera 100). For example, the flexure arms 224 may dampen movement of the image sensor 208 in one or more directions parallel to the optical axis 102*a* and in one or more directions orthogonal to the optical axis 102*a*. In some aspects, the flexure arms 224 may dampen movement of the image sensor 208 in one or more angular directions about an axis orthogonal to the optical axis 102*a*.

Figure 4:
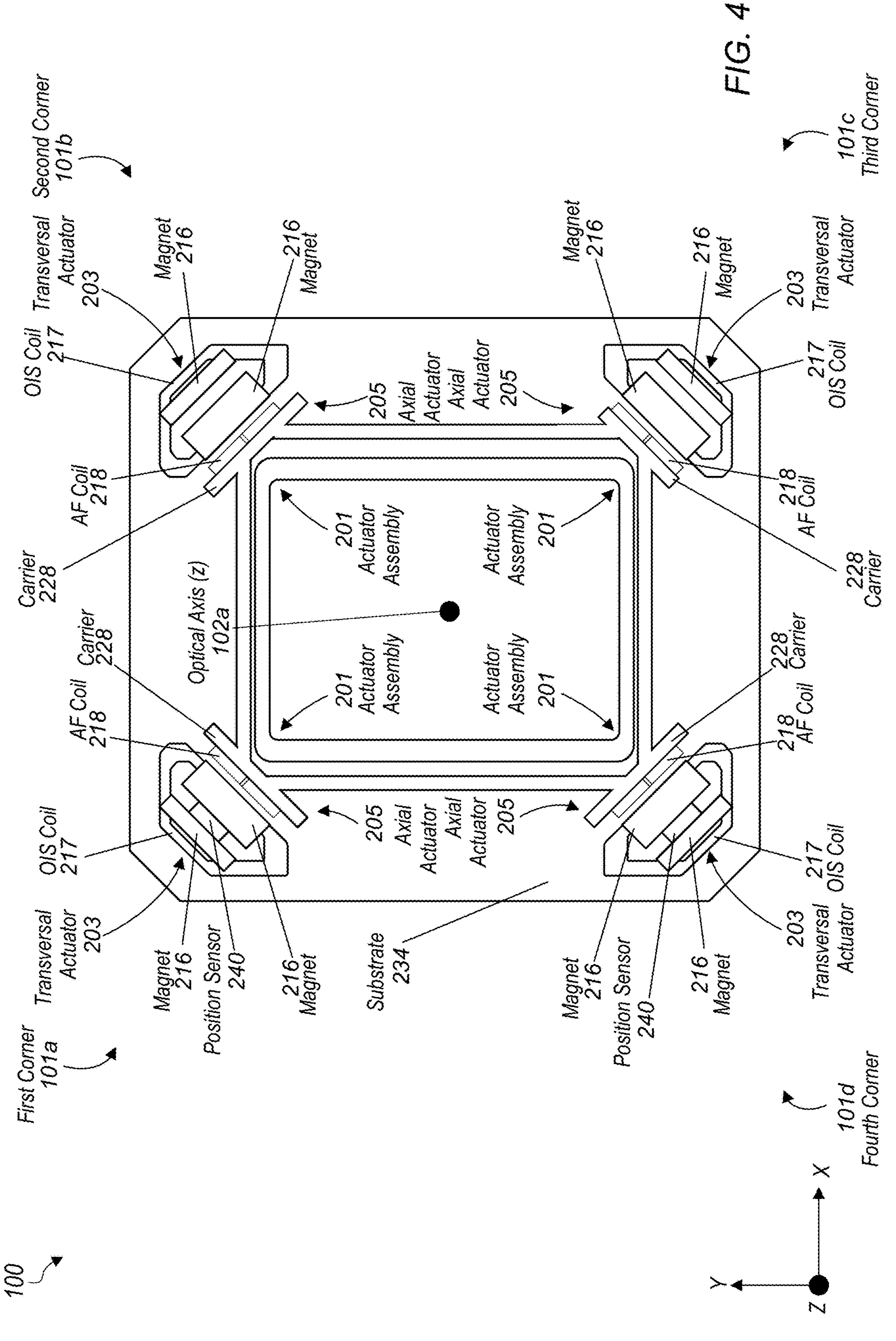
FIG. 4 illustrates an overhead perspective view of an example camera having an actuator module or assembly that may, for example, be used to provide autofocus and/or optical image stabilization through image sensor movement in small form factor cameras, according to at least some embodiments.

FIG. 4 illustrates an overhead perspective view of an example camera 100 having an actuator module or assembly that may, for example, be used to provide autofocus and/or optical image stabilization through image sensor movement in small form factor cameras, according to at least some embodiments. The camera 100 may include one or more same or similar features as the features described with respect to or illustrated in FIGS. 1, 2, 3, 5, 6, 7, 8, 9, 10, 11, and 12. The example X-Y-Z coordinate system shown in FIG. 4 is used to discuss aspects of components and/or systems, and may apply to embodiments described throughout this disclosure.

The actuator assembly 201 may include a plurality of axial actuators 205 and a plurality of transversal actuators 203. The plurality of axial actuators and the plurality of transversal actuators may be positioned around or surrounding the optical axis 102*a* (e.g., and also the image sensor 208). As shown in FIG. 4, the plurality of axial actuators 205 may include four axial actuators 205 and the plurality of transversal actuators 203 may include four transversal actuators 203. The four axial actuators 205 and the four transversal actuators 203 may be paired together such that a first axial actuator 205 is paired with a first transversal actuator 203 and shares a first set of one or more magnets 216, a second axial actuator 205 is paired with a second transversal actuator 203 and shares a second set of one or more magnets 216, a third axial actuator 205 is paired with a third transversal actuator 203 and shares a third set of one or more magnets 216, and a fourth axial actuator 205 is paired with a fourth transversal actuator 203 and shares a fourth set of one or more magnets 216. The respective paired axial actuators 205 and transversal actuators 203 may be positioned at or near corners of the substrate. For example, the substrate 208 may include a rectangular shape (e.g., a square shape) and have four corners: a first corner 101*a*, a second corner 101*b*, a third corner 101*c*, and a fourth corner 101*d*. The first axial actuator 205 paired with the first transversal actuator 203 and sharing the first set of one or more magnets 216 may be positioned at or near the first corner 101*a*. The second axial actuator 205 paired with the second transversal actuator 203 and sharing the second set of one or more magnets 216 may be positioned at or near the second corner 101*b*. The third axial actuator 205 paired with the third transversal actuator 203 and sharing the third set of one or more magnets 216 may be positioned at or near the third corner 101*c*. The fourth axial actuator 205 paired with the fourth transversal actuator 203 and sharing the fourth set of one or more magnets 216 may be positioned at or near the fourth corner 101*d*.

Figure 5:
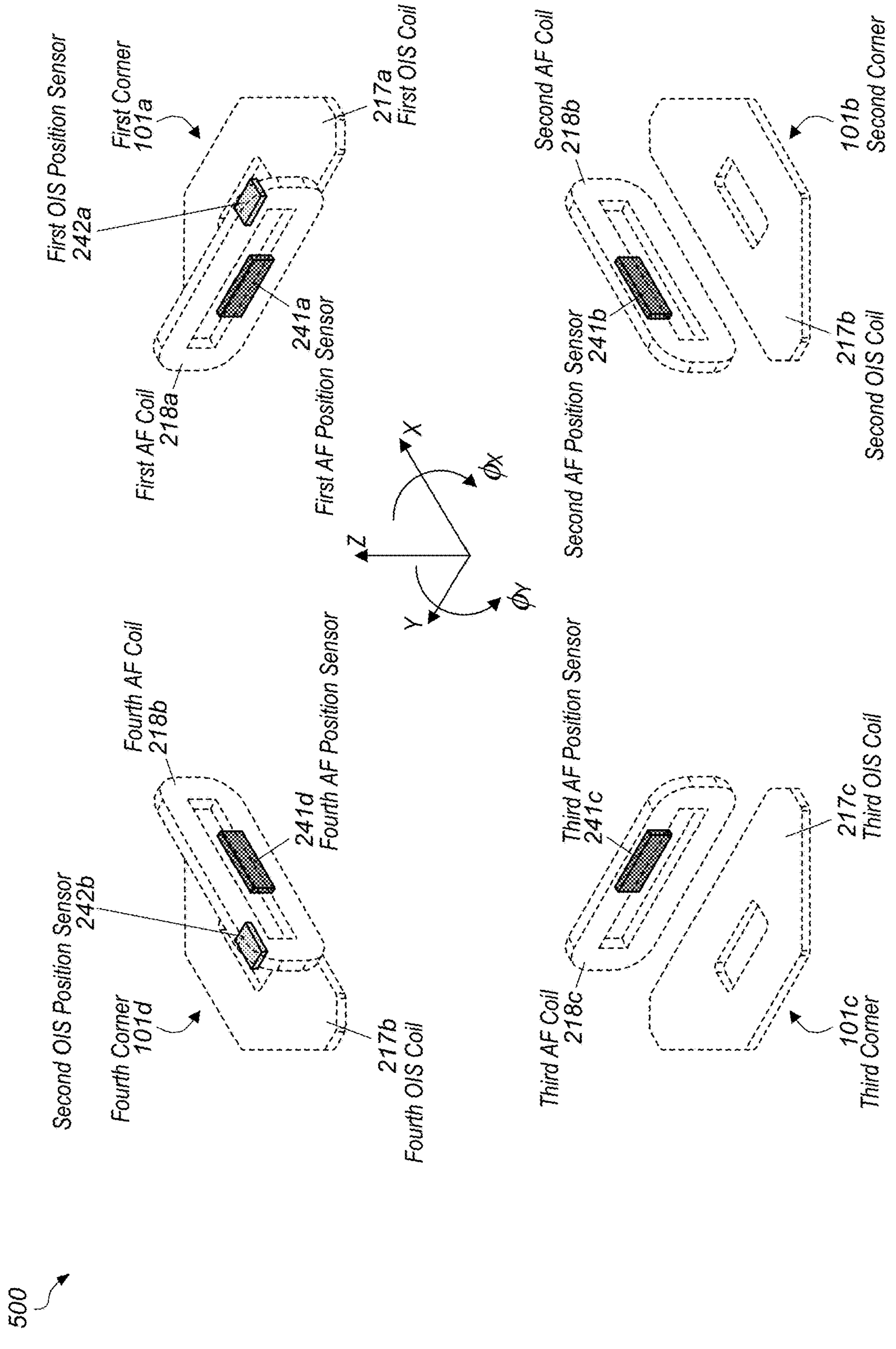
FIG. 5 illustrates an isometric perspective view of an actuator assembly of an example camera that may, for example, be used to provide autofocus and/or optical image stabilization through image sensor movement in small form factor cameras, according to at least some embodiments.

FIG. 5 illustrates an isometric perspective view of an actuator assembly 500 of an example camera that may, for example, be used to provide autofocus and/or optical image stabilization through image sensor movement in small form factor cameras, according to at least some embodiments. The actuator assembly 500 may be the same as or at least similar to the actuator assembly 201 illustrated in FIGS. 1, 2, 3, 4, 7, and 9 and may include one or more same or similar components as the actuator assembly 201 illustrated in FIGS. 1, 2, 3, 4, 7, and 9. The actuator assembly 500 may be the same as or at least similar to the actuator assembly 600 illustrated in FIG. 6 and may include one or more same or similar components as the actuator assembly 600 illustrated in FIG. 6. The actuator assembly 500 may be implemented with the camera 100 illustrated in FIGS. 1, 2, 3, and 4, the camera 700 illustrated in FIGS. 7 and 8, and/or the camera 900 illustrated in FIGS. 9 and 10. The example X-Y-Z coordinate system shown in FIG. 5 is used to discuss aspects of components and/or systems, and may apply to embodiments described throughout this disclosure.

As shown in FIG. 5, the actuator assembly 500 may include a plurality of axial actuators 205 and a plurality of transversal actuators 203. In some aspects, a portion of the axial actuators 205 may include one or more respective AF coils 218 and a portion of the transversal actuators 203 may include one or more respective OIS coils 217. For example, the actuator assembly 500 may include a first OIS coil 217*a* and a first AF coil 218*a* positioned in a first corner 101*a*. The actuator assembly 500 may also include a second OIS coil 217*b* and a second AF coil 218*b* positioned in a second corner 101*b*. The actuator assembly 500 may further include a third OIS coil 217*c* and a third AF coil 218*c* positioned in a third corner 101*c*. In addition, the actuator assembly 500 may include a fourth OIS coil 217*d* and a fourth AF coil 218*d* positioned in a fourth corner 101*d*. As described herein, each of the AF coil and OIS coil pairs in the respective corners may share one or more magnets for driving the image sensor along five different ranges of motion: one or more directions along an the optical axis (z-direction), a direction orthogonal to the optical axis (y-direction), a direction orthogonal to the optical axis (x-direction), an angular direction about a direction orthogonal to the optical axis (y-direction), and an angular direction about a direction orthogonal to the optical axis (x-direction).

Due to the plurality of axial actuators 205 and the plurality of transversal actuators 203, axial movement of the image sensor 208, transversal movement of the image sensor 208, and/or tilt movement of the image sensor 208 may be performed at the sensor level, by individual axial actuators 205, individual transversal actuators 203, and/or by a combination of one or more axial actuators 205 and/or one or more transversal actuators 203. One or more axial actuators 205 and/or one or more transversal actuators 203 may operate to move the image sensor 208 in one or more directions relative to the optical assembly 102. In some instances, all four axial actuators 205 may activate to move the image sensor 208 in a direction along the optical axis 102*a* towards to the optical assembly 102 or in a direction along the optical axis 102*a* away from the optical assembly 102. For example, the first AF coil 218*a* paired with one or more magnets 216 that are shared with the first OIS coil 217*a*, the second AF coil 218*b* paired with one or more magnets 216 that are shared with the second OIS coil 217*b*, the third AF coil 218*c* paired with one or more magnets 216 that are shared with the third OIS coil 217*c*, the fourth AF coil 218*d* paired with one or more magnets 216 that are shared with the fourth OIS coil 217*d* may all together receive a current for activation to drive the image sensor 208 in a direction parallel to the optical axis 102*a* and towards the optical assembly 102 and/or to drive the image sensor 208 in a direction parallel to the optical axis 102*a* and away from the optical assembly 102. In some aspects, one or more of the axial actuators (e.g., four axial actuators) may include position sensors (e.g., hall sensors) to detect movement and/or a change in position of the respective axial actuators 205 (and therefore of the image sensor) along the optical axis (e.g., the z-direction). For example, the first AF coil 218*a* may include a first AF position sensor 241*a*, the second AF coil 218*b* may include a second AF position sensor 241*b*, the third AF coil 218*c* may include a third AF position sensor 241*c*, and the fourth AF coil 218*d* may include a fourth AF position sensor 241*d*. Each of the individual AF positions sensors may sense a variation in magnet fields to determine the z-position of each individual axial actuator 205 (e.g., the portion of the axial actuator 205, the AF coil(s) 218).

In some instances, one or more transversal actuators may activate to move the image sensor in a direction orthogonal to the optical axis. For example, the first OIS coil 217*a* paired with one or more magnets 216 that are shared with the first AF coil 218*a* and the third OIS coil 217*c* paired with one or more magnets 216 that are shared with the third AF coil 218*c* may be used to drive the image sensor 208 in one or more directions along an axis (e.g., the x-axis) orthogonal to the optical axis 102*a* (e.g., the z-axis). Similarly, the second OIS coil 217*b* paired with one or more magnets 216 that are shared with the second AF coil 218*b* and the fourth OIS coil 217*d* paired with one or more magnets 216 that are shared with the fourth AF coil 218*d* may be used to drive the image sensor 208 in one or more directions along an axis (e.g., the y-axis) orthogonal to the optical axis 102*a* (e.g., the z-axis). As another example, the first OIS coil 217*a* paired with one or more magnets 216 that are shared with the first AF coil 218*a* and the third OIS coil 217*c* paired with one or more magnets 216 that are shared with the third AF coil 218*c* used in combination with the second OIS coil 217*b* paired with one or magnets 216 that are shared with the second AF coil 218*b* may be used to drive the image sensor 208 in one or more directions along an axis (e.g., between x-axis and the y-axis) orthogonal to the optical axis 102*a* (e.g., the z-direction). As yet another example, the second OIS coil 217*b* paired with one or more magnets 216 that are shared with the second AF coil 218*b* and the fourth OIS coil 217*d* paired with one or more magnets 216 that are shared with the fourth AF coil 218*d* in combination with the first OIS coil 217*a* paired with one or more magnets 216 that are shared with the first AF coils 218*a* may be used to drive the image sensor 208 in one or more directions along an axis (e.g., between the y-axis and the x-axis) orthogonal to the optical axis 102*a* (e.g., the z-axis).

In some aspects, one or more of the transversal actuators 203 (e.g., at least two transversal actuators 203) may include position sensors (e.g., hall sensors) to detect movement and/or a change in position of the respective transversal actuator 203 (and therefore of the image sensor) along the x-axis and the y-axis. For example, the first OIS coil 217*a* may include a first OIS position sensor 242*a* and the second OIS coil 217*b* may include a second OIS position sensor 242*b*. Each of the individual OIS positions sensors may sense a variation in magnet fields to determine the x-position and/or the y-position of each individual transversal actuator 203 (e.g., the portion of the transversal actuator 203, the OIS coil(s) 217).

In some aspects, one or more axial actuators 205 may activate to tilt the image sensor 208 in an angular direction about an axis that is orthogonal to the optical axis. In some cases, axial actuators 205 positioned in opposite corners from each other on the substrate 234 may activate to tilt the image sensor 208. One axial actuator may activate to drive the image sensor in a direction parallel to the optical axis and towards the optical assembly and the other axial actuator may activate to drive the image sensor in another direction parallel to the optical axis and away from the optical assembly causing the image sensor to tilt about an axis orthogonal to the optical axis. For example, the first AF coil 218*a* paired with one or more magnets 216 that are shared with the first OIS coil 217*a* in the first corner 101*a* and the third AF coil 218*c* paired with one or more magnets 216 that are shared with the third OIS coil 217*c* in the third corner 101*c* may both receive a current for activation to drive the image sensor 208. For instance, the first AF coil 218*a* may receive a current to drive the image sensor 208 in a direction parallel to the optical axis 102*a* and towards the optical assembly 102 and the third AF coil 218*c* may receive a current to drive the image sensor 208 in a direction parallel to the optical axis 102*a* and away from the optical assembly 102 causing an angular rotation (e.g., a tilt) of the image sensor 208 about the y-axis (θy). In this case, the first AF position sensor 241*a* may sense that the first AF coil 218*a* is at a first elevation and the third AF position sensor 241*c* may sense that the third AF coil 218*c* is at a second elevation different from the first elevation for determining that the image sensor 208 is tilted about the y-axis.

As another example, the second AF coil 218*b* paired with one or more magnets 216 that are shared with the second OIS coil 217*b* in the second corner 101*b* and the fourth AF coil 218*d* paired with one or more magnets 216 that are shared with the fourth OIS coil 217*d* in the fourth corner 101*d* may both receive a current for activation to drive the image sensor 208. For instance, the second AF coil 218*b* may receive a current to drive the image sensor 208 in a direction parallel to the optical axis 102*a* and towards the optical assembly 102 and the fourth AF coil 218*d* may receive a current to drive the image sensor 208 in a direction parallel to the optical axis 102*a* and away from the optical assembly 102 causing an angular rotation (e.g., a tilt) of the image sensor 208 about the x-axis (θx). In this case, the second AF position sensor 241*b* may sense that the second AF coil 218*b* is at a third elevation and the fourth AF position sensor 241*d* may sense that the fourth AF coil 218*c* is at a fourth elevation different from the third elevation for determining that the image sensor 208 is tilted about the x-axis. The axial actuators 205 may be individually activated at the same time for moving the image sensor 208 in different magnitudes and/or directions (e.g., along the optical axis 102*a*) to tilt the image sensor 208 in a plurality of different ways.

Figure 6:
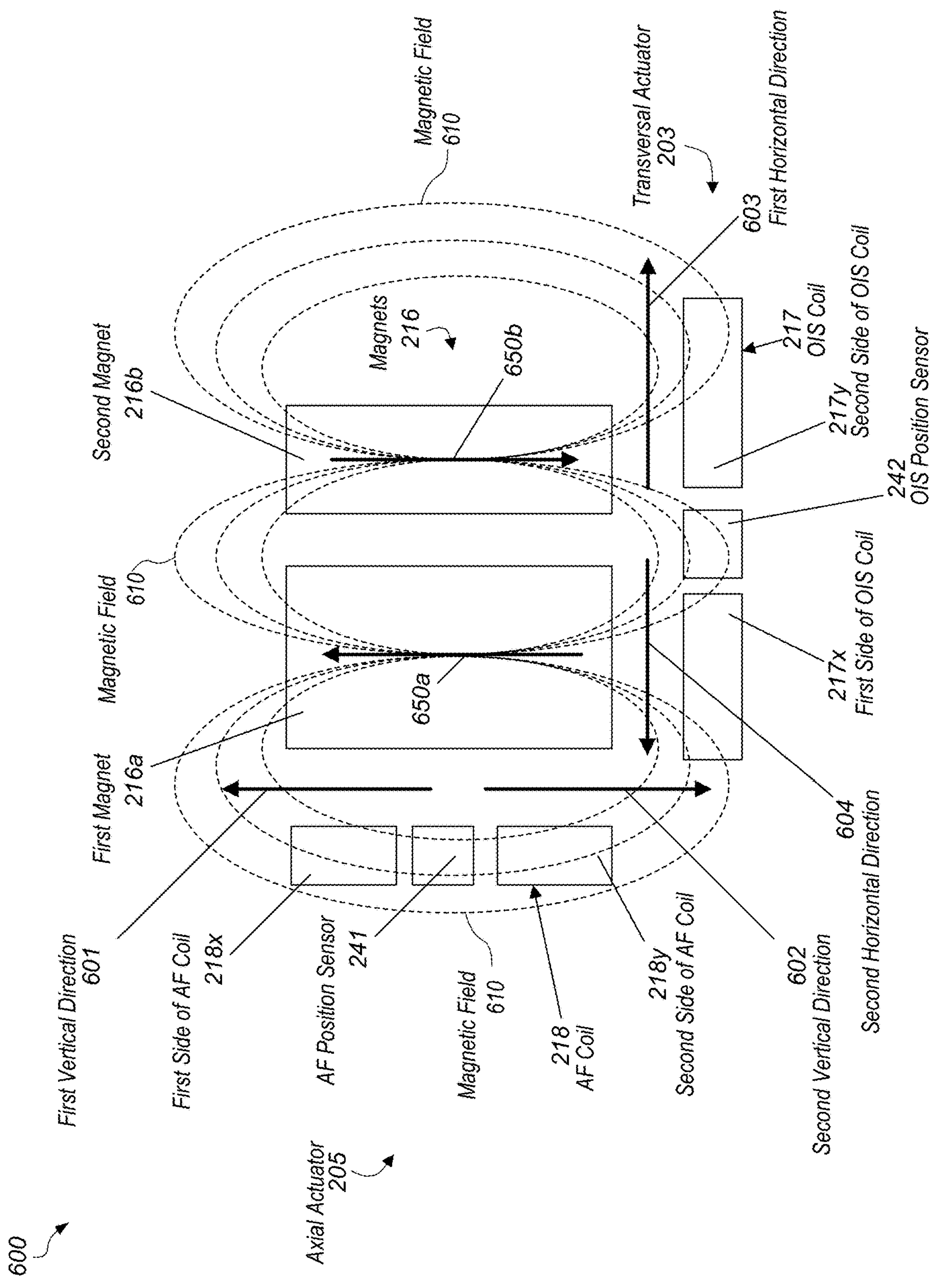
FIG. 6 illustrates a cross-sectional perspective view of an actuator assembly of an example camera that may, for example, be used to provide autofocus and/or optical image stabilization through image sensor movement in small form factor cameras, according to at least some embodiments.

FIG. 6 illustrates a cross-sectional perspective view of an actuator assembly 600 of an example camera 100 that may, for example, be used to provide autofocus and/or optical image stabilization through image sensor movement in small form factor cameras, according to at least some embodiments. The actuator assembly 600 may be the same as or at least similar to the actuator assembly 201 illustrated in FIGS. 1, 2, 3, 4, 7, and 9 and may include one or more same or similar components as the actuator assembly 201 illustrated in FIGS. 1, 2, 3, 4, 7, and 9. The actuator assembly 600 may be the same as or at least similar to the actuator assembly 500 illustrated in FIG. 5 and may include one or more same or similar components as the actuator assembly 500 illustrated in FIG. 5. The actuator assembly 600 may be implemented with the camera 100 illustrated in FIGS. 1, 2, 3, and 4, the camera 700 illustrated in FIGS. 7 and 8, and/or the camera 900 illustrated in FIGS. 9 and 10.

As at similarly described herein, the actuator assembly 600 may include an axial actuator 205 for motion of the image sensor 208 in one or more directions parallel to an optical axis 102*a* of the optical assembly 102 (AF) and a transversal actuator 203 for motion of the image sensor 208 in one or more directions orthogonal to the optical axis of the optical assembly (OIS). In some aspects, the transversal actuators 205 and/or the axial actuators 203 may include voice coil motors (VCM) utilizing Lorentz forces to move the image sensor 208 in one or more directions relative to a stationary structure of the camera. For example, the transversal actuators 203 may include one or more transverse motion (OIS motion) VCMs and the axial actuators 205 may include one or more axial motion (AF motion) VCMs.

A portion of the transversal actuator 203 may include one or more OIS coils 217 and a portion of the axial actuator 205 may include one or more AF coils 218. The other portion of the transversal actuator 203 and the other portion of the axial actuator 205 may include one or more shared magnets 216. As shown in FIG. 6, the one or more shared magnets 216 may include a first magnet 216*a* and a second magnet 216*b*. The first magnet 216*a* and the second magnet 216*b* may be arranged such that their respective magnetic fields reach both the one or more OIS coils 217 and the one or more AF coils 218 and their respective polarities face in opposite directions. For example, the first magnet 216*a* may have a positive charge at a location on the first magnet 216*a* facing away from the OIS coil 217 and a negative charge at a location on the first magnet 216*a* facing towards the OIS coil 217 creating a magnetic field 610 moving in the first direction 650*a*. Conversely, the second magnet 216*b* may have a negative charge at a location on the second magnet 216*b* facing away from the OIS coil 217 and a positive charge at a location on the second magnet 216*b* facing towards the OIS coil 217 creating a magnetic field 610 moving in the second direction 650*b* opposite the first direction 650*b*.

As described herein, when the AF coil 218 receives an electric current, a magnetic field produced by the shared magnets 216 may interact with the electrical current through the AF coil 218 (e.g., Lorentz forces) to drive the image sensor 208 in a direction parallel to the optical axis 102*a* of the camera 100 and/or in an angular direction about an axis orthogonal to the optical axis 102*a* of the camera 100. For example, when the AF coil 218 receives an electric current that travels out of the page on the first side of the AF coil 218*a* and into the page on the second side of the AF coil 218*b*, the AF coil 218 (and the image sensor 208) may move (relative to the magnets 216, relative the optical assembly 102) in the first vertical direction 601. Conversely, when the AF coil 218 receives an electric current that travels into the page on the first side of the AF coil 218*a* and out of the page on the second side of the AF coil 218*b*, the AF coil 218 (and the image sensor 208) may move (relative to the magnets 216, relative the optical assembly 102) in the second vertical direction 602. The AF position sensor 241 (e.g., a hall sensor) may be used to detect movement and/or a change in position of the AF coil 218 (and therefore of the image sensor) along the optical axis (e.g., the z-direction). The AF positions sensor 241 may sense a variation in magnet fields to determine the z-position of the AF coil 218.

As described herein, when the OIS coil 217 receives an electric current, a magnetic field produced by the shared magnets 216 may interact with the electrical current through the OIS coil 217 (e.g., Lorentz forces) to drive the image sensor 208 in a direction orthogonal to the optical axis 102*a* of the camera 100. For example, when the OIS coil 217 receives an electric current that travels out of the page on the first side of the OIS coil 217*a* and into the page on the second side of the OIS coil 217*b*, the OIS coil 217 (and the image sensor 208) may move (relative to the magnets 216, relative the optical assembly 102) in the first horizontal direction 603. Conversely, when the OIS coil 217 receives an electric current that travels into the page on the first side of the OIS coil 217*a* and out of the page on the second side of the OIS coil 217*b*, the OIS coil 217 (and the image sensor 208) may move (relative to the magnets 216, relative the optical assembly 102) in the second horizontal direction 604. The OIS position sensor 242 (e.g., a hall sensor) may be used to detect movement and/or a change in position of the OIS coil 217 (and therefore of the image sensor) in a direction orthogonal to the optical axis (e.g., the x-direction, the y-direction). The OIS positions sensor 242 may sense a variation in magnet fields to determine the x-position and/or the y-position of the OIS coil 217.

In some aspects, when the one or more OIS coils receive an electric current, a magnetic field produced by the one or more shared magnets may interact with the electrical current through the OIS coils (e.g., Lorentz forces) to drive the image sensor in a direction orthogonal to the optical axis of the camera. In some instances, magnets as described herein may include bi-pole magnets. In some aspects, the magnets may include a pair of magnets in which a positive side of a first magnet faces towards the portion of the transversal actuator (e.g., the OIS coils) and a negative side of a second magnet faces towards the portion of the transversal actuator (e.g., the OIS coils).

Figure 7:
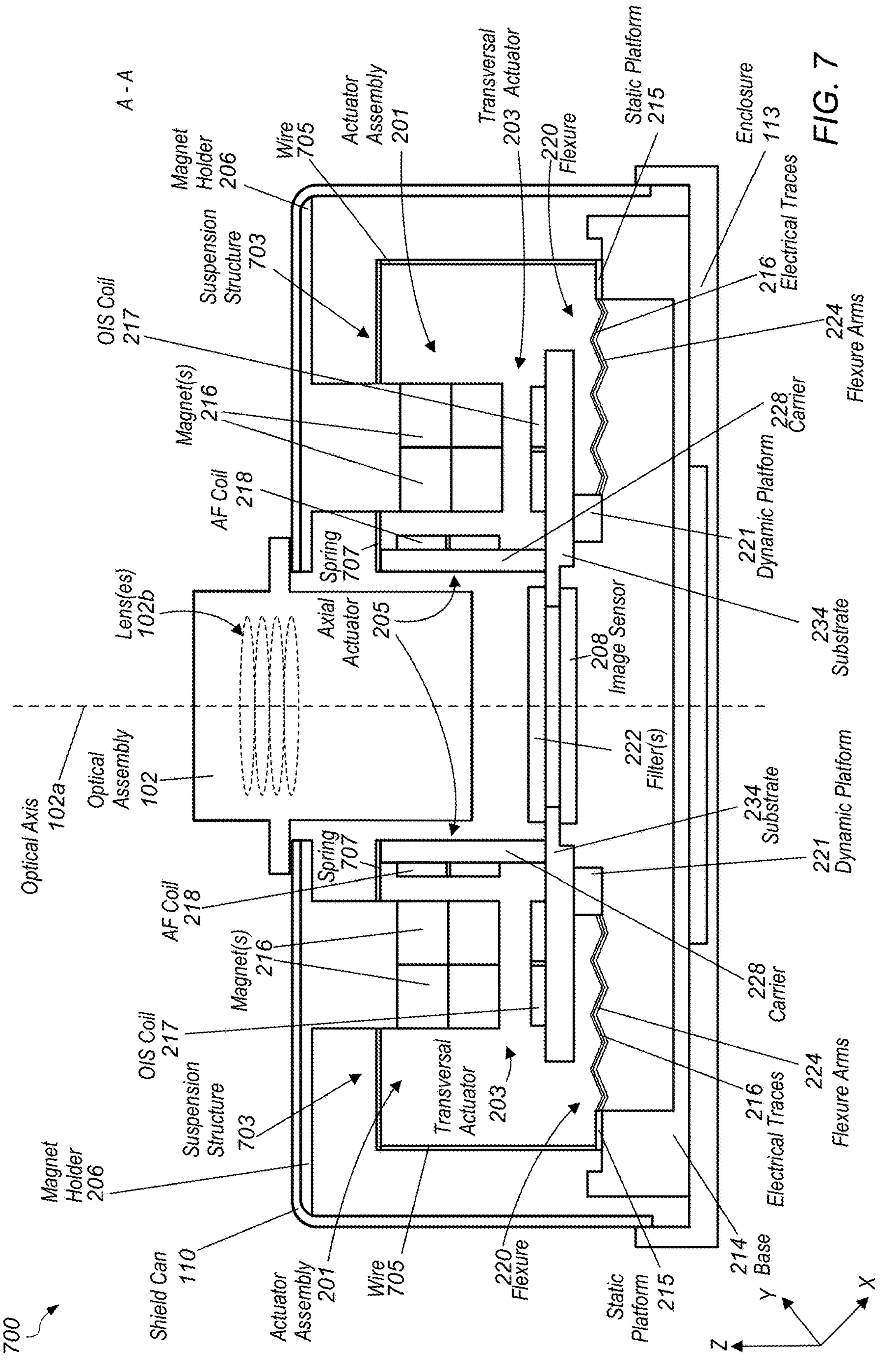
FIG. 7 illustrate a cross-sectional perspective view of an example camera, across the A-A plane, having an actuator module or assembly that may, for example, be used to provide autofocus and/or optical image stabilization through image sensor movement in small form factor cameras, according to at least some embodiments.
Figure 8:
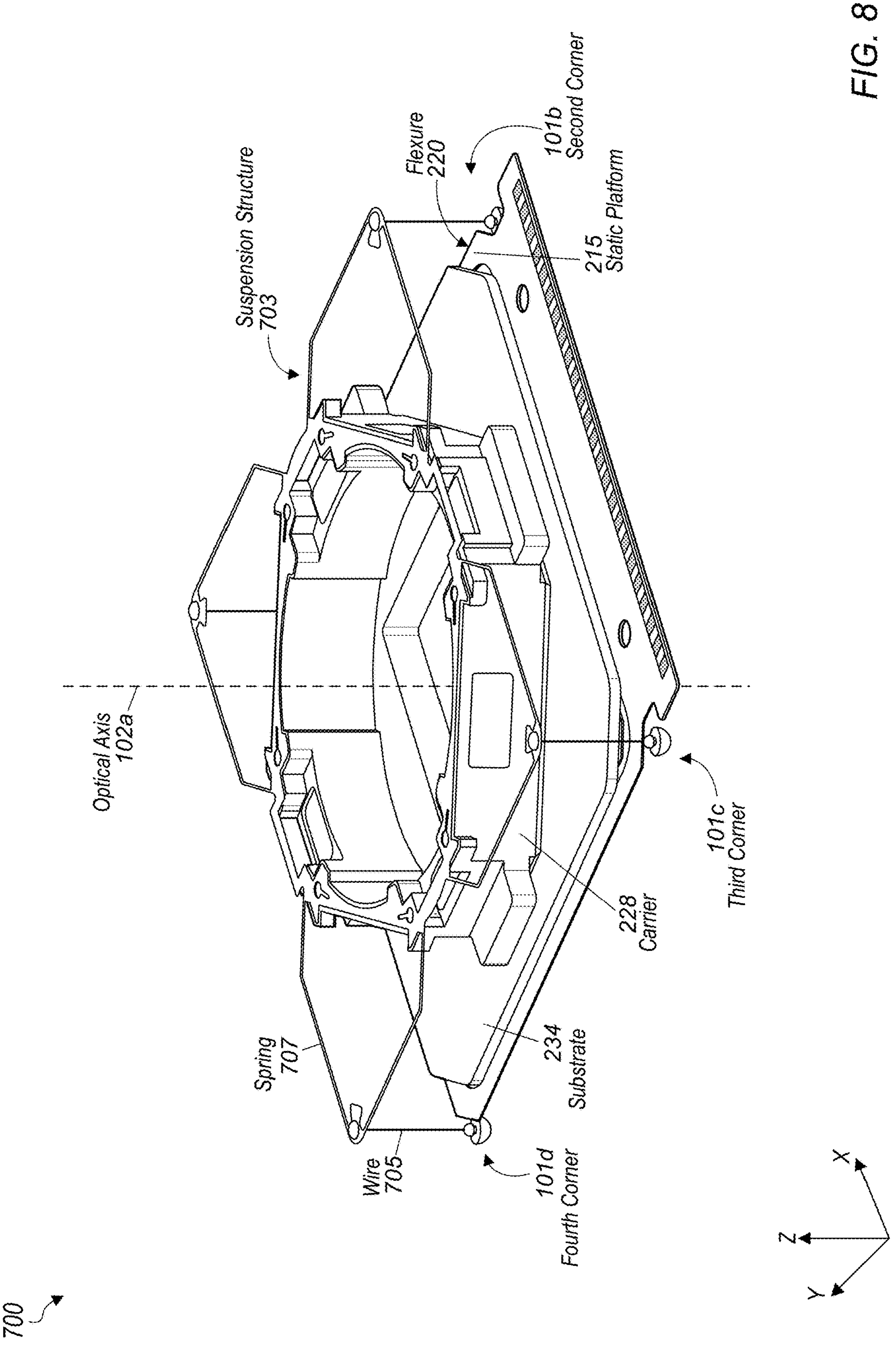
FIG. 8 illustrates an isometric perspective view of an example camera that may, for example, be used to provide autofocus and/or optical image stabilization through image sensor movement in small form factor cameras, according to at least some embodiments.

FIG. 7 illustrate a cross-sectional perspective view of an example camera 700, across the A-A plane, having an actuator module or assembly that may, for example, be used to provide autofocus and/or optical image stabilization through image sensor movement in small form factor cameras, according to at least some embodiments. FIG. 8 illustrates an isometric perspective view of the example camera 700 that may, for example, be used to provide autofocus and/or optical image stabilization through image sensor movement in small form factor cameras, according to at least some embodiments. The camera 700 may include one or more same or similar features as the features described with respect to or illustrated in FIGS. 1 2, 3, 4, 5, 6, 9, 10, 11, and 12. The example X-Y-Z coordinate system shown in FIGS. 7 and 8 is used to discuss aspects of components and/or systems, and may apply to embodiments described throughout this disclosure.

As described herein, movement of the image sensor 208 may be dampened using a flexure 220. The flexure 220 may include the static platform 215, the dynamic platform 221, and the plurality of flexure arms 224. The static platform 215 may be fixedly coupled to an enclosure 113 at the lower side (e.g., opposite from the optical assembly) of the camera 700. In some aspects, the static platform 215 may be fixedly attached to the base 214 and the base 214 may be fixedly attached to the enclosure 113 at the lower side of the camera 700. The static platform 215 may remain static relative to movement of the image sensor 208. The dynamic platform 215 may be fixedly coupled to the image sensor 208. In some aspects, the dynamic platform 215 may be fixedly attached to the substrate 234 and the substrate 234 may be fixedly attached to the image sensor 208. In some aspects, the dynamic platform 221 may be fixedly attached to the substrate 234, the substrate 234 may be fixedly attached to a ceramic layer, and the ceramic layer may be fixedly attached to the image sensor 208. The dynamic platform 221 may move relative to the static platform 215. The flexure arms 224 may mechanically attach the static platform 215 to the dynamic platform 221. The flexure arms 224 may permit and/or dampen movement of the dynamic platform 221 (and therefore the image sensor 208) relative to the static platform 215 (and therefore a remainder of the camera 700). For example, the flexure arms 224 may dampen movement of the image sensor 208 in one or more directions parallel to the optical axis 102*a* and in one or more directions orthogonal to the optical axis 102*a*. In some aspects, the flexure arms 224 may dampen movement of the image sensor 208 in one or more angular directions about an axis orthogonal to the optical axis 102*a*.

Figure 10:
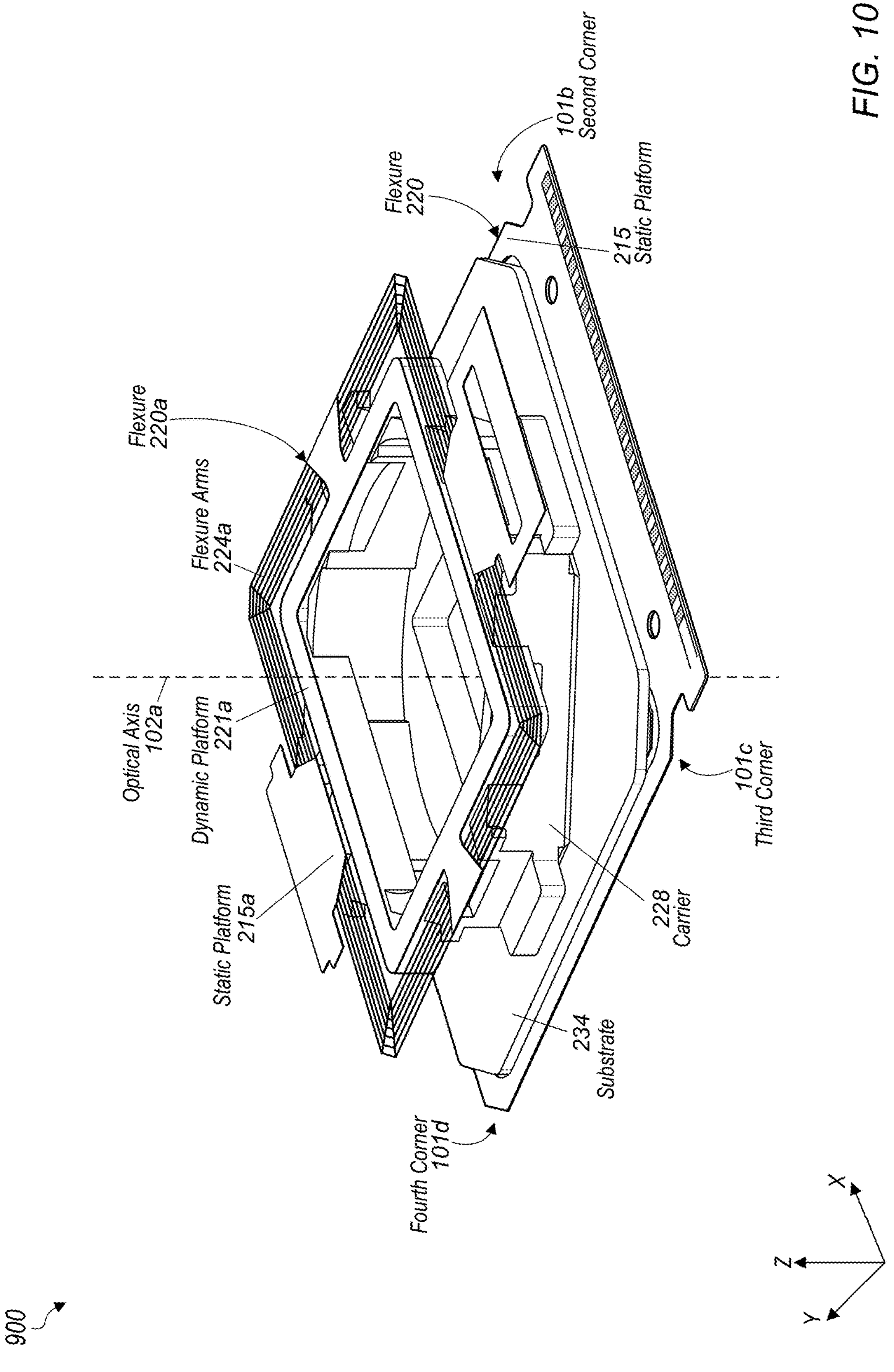
FIG. 10 illustrates an isometric perspective view of an example camera that may, for example, be used to provide autofocus and/or optical image stabilization through image sensor movement in small form factor cameras, according to at least some embodiments.

Additionally, or alternatively, movement of the image sensor 208 may be dampened using a suspension structure 703. The suspension structure 703 may couple the substrate 234 to a static portion of the camera 700 (e.g., the static platform 215) for suspending the substrate 234 (and thus the image sensor 208) relative to the static portion of the camera 700. In some aspects, the suspension structure 703 may include a spring 707 and a wire 705. The spring 707 and the wire 705 may be attached at one end to a static portion of the camera 700 (e.g., the static platform 215). The spring 707 may be attached to the carrier 228 retaining the portion of the axial actuator 205 (e.g., one or more AF coils 218). The wire 705 may be attached to the static platform 215. The spring 707 and the wire 505 may provide suspension to the image sensor 208 in one or more directions parallel to the optical axis 102*a* and in one or more directions orthogonal to the optical axis 102*a*. In some aspects, the spring 707 and the wire 705 may suspend the image sensor 208 in one or more angular directions about an axis orthogonal to the optical axis 102*a*. As shown in FIG. 10, the suspension structure 703 may be positioned in the four corners of the camera 700: the first corner 101*a*, the second corner 101*b*, the third corner 101*c*, and the four corner 101*d*. The wire(s) 705 may be attached to the static platform 215 and the spring(s) 707 may be attached to the carrier 228 at each of the first corner 101*a*, the second corner 101*b*, the third corner 101*c*, and the four corner 101*d*.

Figure 9:
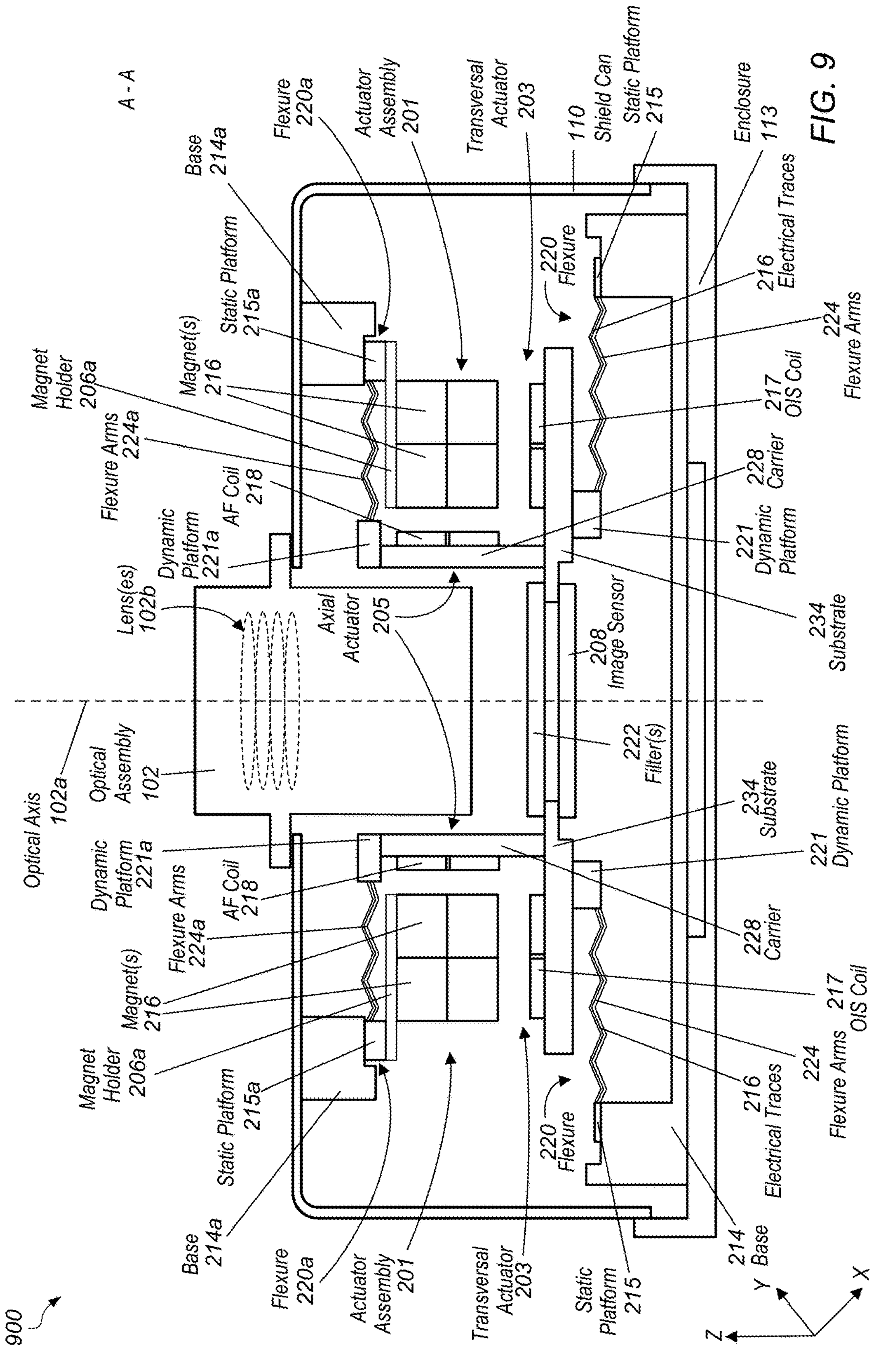
FIG. 9 illustrate a cross-sectional perspective view of an example camera, across the A-A plane, having an actuator module or assembly that may, for example, be used to provide autofocus and/or optical image stabilization through image sensor movement in small form factor cameras, according to at least some embodiments.

FIG. 9 illustrate a cross-sectional perspective view of an example camera 900, across the A-A plane, having an actuator module or assembly that may, for example, be used to provide autofocus and/or optical image stabilization through image sensor movement in small form factor cameras, according to at least some embodiments. FIG. 10 illustrates an isometric perspective view of the example camera 900 that may, for example, be used to provide autofocus and/or optical image stabilization through image sensor movement in small form factor cameras, according to at least some embodiments. The camera 900 may include one or more same or similar features as the features described with respect to or illustrated in FIGS. 1 2, 3, 4, 5, 6, 7, 8, 11, and 12. The example X-Y-Z coordinate system shown in FIGS. 9 and 10 is used to discuss aspects of components and/or systems, and may apply to embodiments described throughout this disclosure.

As described herein, movement of the image sensor 208 may be dampened using a flexure 220. The flexure 220 may include the static platform 215, the dynamic platform 221, and the plurality of flexure arms 224. The static platform 215 may be fixedly coupled to an enclosure 113 at the lower side (e.g., opposite from the optical assembly) of the camera 700. In some aspects, the static platform 215 may be fixedly attached to the base 214 and the base 214 may be fixedly attached to the enclosure 113 at the lower side of the camera 700. The static platform 215 may remain static relative to movement of the image sensor 208. The dynamic platform 215 may be fixedly coupled to the image sensor 208. In some aspects, the dynamic platform 215 may be fixedly attached to the substrate 234 and the substrate 234 may be fixedly attached to the image sensor 208. In some aspects, the dynamic platform 221 may be fixedly attached to the substrate 234, the substrate 234 may be fixedly attached to a ceramic layer, and the ceramic layer may be fixedly attached to the image sensor 208. The dynamic platform 221 may move relative to the static platform 215. The flexure arms 224 may mechanically attach the static platform 215 to the dynamic platform 221. The flexure arms 224 may permit and/or dampen movement of the dynamic platform 221 (and therefore the image sensor 208) relative to the static platform 215 (and therefore a remainder of the camera 700). For example, the flexure arms 224 may dampen movement of the image sensor 208 in one or more directions parallel to the optical axis 102*a* and in one or more directions orthogonal to the optical axis 102*a*. In some aspects, the flexure arms 224 may dampen movement of the image sensor 208 in one or more angular directions about an axis orthogonal to the optical axis 102*a*.

Additionally, or alternatively, movement of the image sensor 208 may be dampened using another flexure 220*a*. At least similar the flexure 220, the other flexure 220*a* may include a static platform 215*a*, a dynamic platform 221*a*, and a plurality of flexure arms 224*a*. In this case, the static platform 215*a* may be fixedly coupled to an enclosure at the upper side (e.g., the same side as the optical assembly) of the camera 900 (e.g., the shield can 110, a base 214*a* fixed attached to the shield can 110). In some aspects, the static platform 215*a* may be fixedly attached to the shield can 110 forming the upper side of the camera 900. The static platform 215*a* may remain static relative to movement of the image sensor 208. The dynamic platform 221*a* may be fixedly coupled to the image sensor 208. For example, the dynamic platform 221*a* may be fixedly attached to the carrier 228, the carrier 228 may be fixedly attached to the substrate 234, and the substrate 234 may be fixedly attached to the image sensor 208. In some aspects, the dynamic platform 221*a* may be fixedly attached to the carrier 228, the carrier 228 may be fixedly attached to the substrate 234, the substrate 234 may be fixedly attached to a ceramic layer, and the ceramic layer may be fixedly attached to the image sensor 208. The dynamic platform 221*a* may move relative to the static platform. The flexure arms 224*a* may mechanically attach the static platform 215*a* to the dynamic platform 221*a*. The flexure arms 224*a* may permit and/or dampen movement of the dynamic platform 221*a* (and therefore the image sensor 208) relative to the static platform 215*a* (and therefore a remainder of the camera 900). For example, the flexure arms 224*a* may dampen movement of the image sensor 208 in one or more directions parallel to the optical axis 102*a* and in one or more directions orthogonal to the optical axis 102*a*. In some aspects, the flexure arms 224*a* may dampen movement of the image sensor 208 in one or more angular directions about an axis orthogonal to the optical axis 102*a*.

Figure 11:
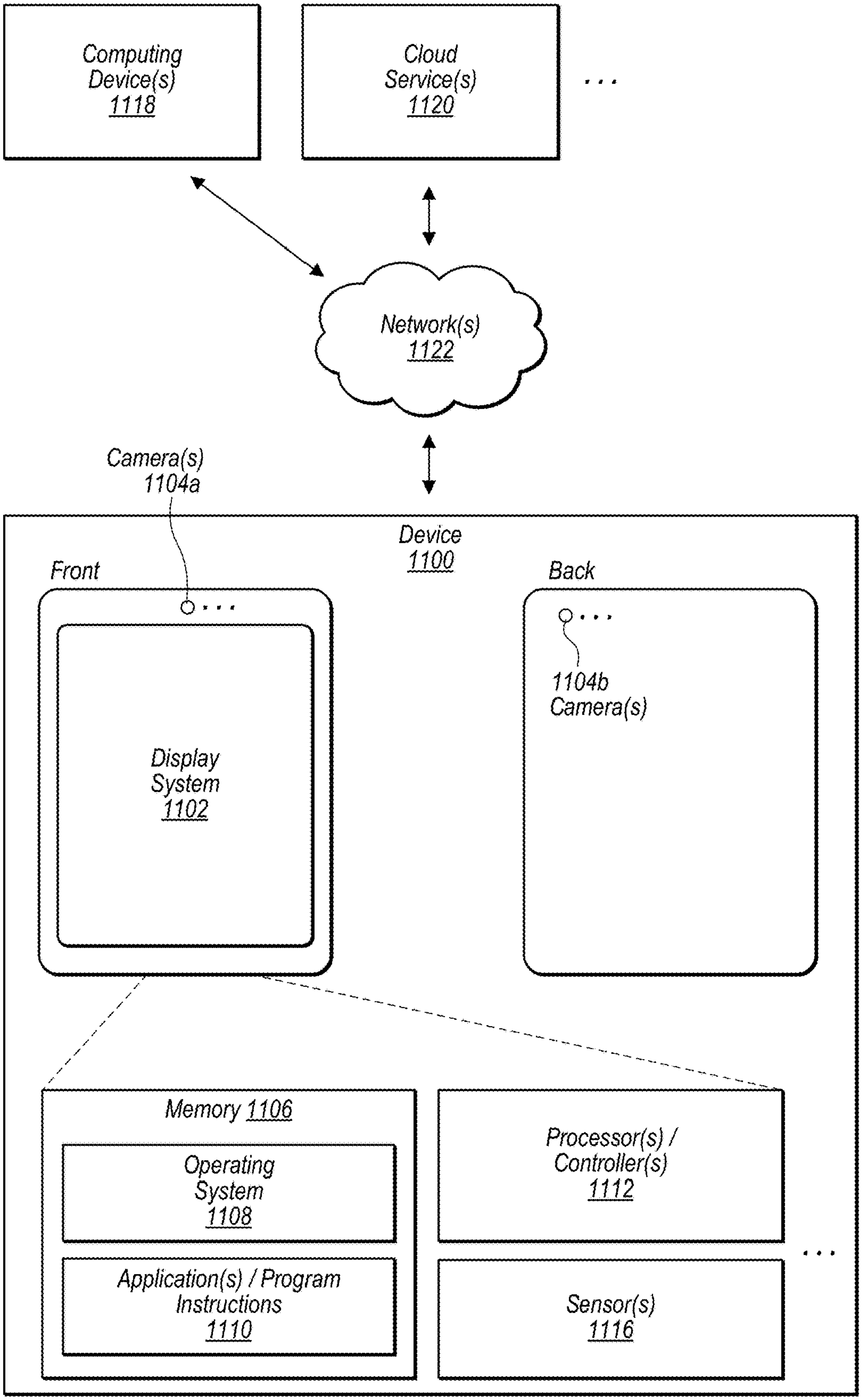
FIG. 11 illustrates a schematic representation of an example device that may include a camera, in accordance with some embodiments.

FIG. 11 illustrates a schematic representation of an example device 1100 that may include a camera (e.g., as described herein with respect to FIGS. 1, 2, 3, 4, 5, 6, 7, 8, 9, 10, and 12), in accordance with some embodiments. In some embodiments, the device 1100 may be a mobile device and/or a multifunction device. In various embodiments, the device 1100 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 1100 may include a display system 1102 (e.g., comprising a display and/or a touch-sensitive surface) and/or one or more cameras 1104. In some non-limiting embodiments, the display system 1102 and/or one or more front-facing cameras 1104*a* may be provided at a front side of the device 1100, e.g., as indicated in FIG. 11. Additionally, or alternatively, one or more rear-facing cameras 1104*b* may be provided at a rear side of the device 1100. In some embodiments comprising multiple cameras 1104, some or all of the cameras may be the same as, or similar to, each other. Additionally, or alternatively, some or all of the cameras may be different from each other. In various embodiments, the location(s) and/or arrangement(s) of the camera(s) 1104 may be different than those indicated in FIG. 11.

Among other things, the device 1100 may include memory 1106 (e.g., comprising an operating system 1108 and/or application(s)/program instructions 1110), one or more processors and/or controllers 1112 (e.g., comprising CPU(s), memory controller(s), display controller(s), and/or camera controller(s), etc.), and/or one or more sensors 1116 (e.g., orientation sensor(s), proximity sensor(s), and/or position sensor(s), etc.). In some embodiments, the device 1100 may communicate with one or more other devices and/or services, such as computing device(s) 1118, cloud service(s) 1120, etc., via one or more networks 1122. For example, the device 1100 may include a network interface (e.g., network interface 1110) that enables the device 1100 to transmit data to, and receive data from, the network(s) 1122. Additionally, or alternatively, the device 1100 may be capable of communicating with other devices via wireless communication using any of a variety of communications standards, protocols, and/or technologies.

Figure 12:
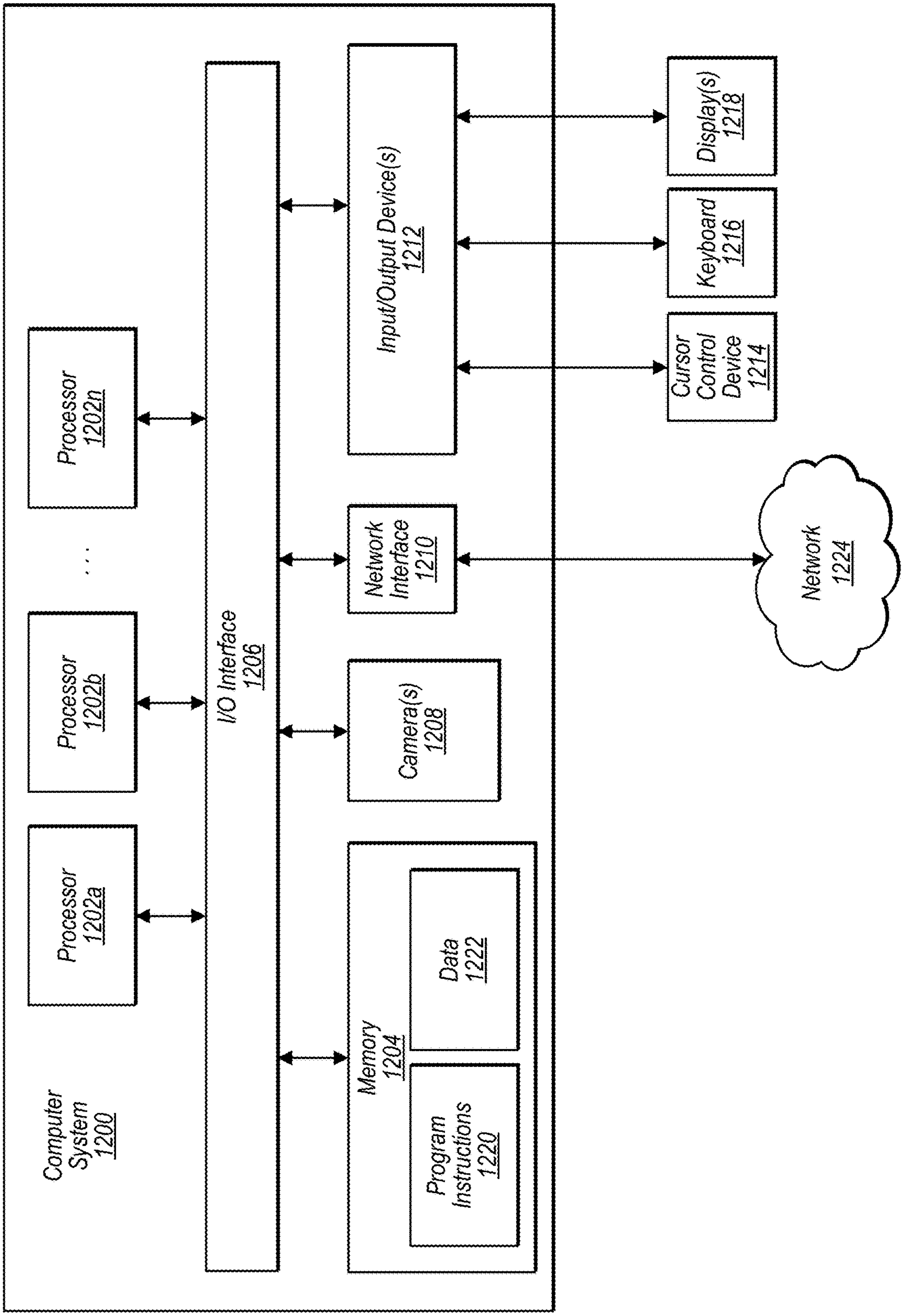
FIG. 12 illustrates a schematic block diagram of an example computing device, referred to as computer system, that may include or host embodiments of a camera, in accordance with some embodiments.

FIG. 12 illustrates a schematic block diagram of an example computing device, referred to as computer system 1200, that may include or host embodiments of a camera (e.g., as described herein with respect to FIGS. 1, 2, 3, 4, 5, 6, 7, 8, 9, 10, and 11). In addition, computer system 1200 may implement methods for controlling operations of the camera and/or for performing image processing images captured with the camera. In some embodiments, the device 1200 (described herein with reference to FIG. 12) may additionally, or alternatively, include some or all of the functional components of the computer system 1200 described herein.

The computer system 1200 may be configured to execute any or all of the embodiments described above. In different embodiments, computer system 1200 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1200 includes one or more processors 1202 coupled to a system memory 1204 via an input/output (I/O) interface 1206. Computer system 1200 further includes one or more cameras 1208 coupled to the I/O interface 1206. Computer system 1200 further includes a network interface 1210 coupled to I/O interface 1206, and one or more input/output devices 1212, such as cursor control device 1214, keyboard 1216, and display(s) 1218. In some cases, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1202, or a multiprocessor system including several processors 1202 (e.g., two, four, eight, or another suitable number). Processors 1202 may be any suitable processor capable of executing instructions. For example, in various embodiments processors 1202 may be general-purpose or embedded processors implementing any of a variety of instruction set architectures (ISAs), such as the x86, PowerPC, SPARC, or MIPS ISAs, or any other suitable ISA. In multiprocessor systems, each of processors 1202 may commonly, but not necessarily, implement the same ISA.

System memory 1204 may be configured to store program instructions 1220 accessible by processor 1202. In various embodiments, system memory 1204 may be implemented using any suitable memory technology, such as static random access memory (SRAM), synchronous dynamic RAM (SDRAM), nonvolatile/Flash-type memory, or any other type of memory. Additionally, existing camera control data 1222 of memory 1204 may include any of the information or data structures described above. In some embodiments, program instructions 1220 and/or data 1222 may be received, sent or stored upon different types of computer-accessible media or on similar media separate from system memory 1204 or computer system 1200. In various embodiments, some or all of the functionality described herein may be implemented via such a computer system 1200.

In one embodiment, I/O interface 1206 may be configured to coordinate I/O traffic between processor 1202, system memory 1204, and any peripheral devices in the device, including network interface 1210 or other peripheral interfaces, such as input/output devices 1212. In some embodiments, I/O interface 1206 may perform any necessary protocol, timing or other data transformations to convert data signals from one component (e.g., system memory 1204) into a format suitable for use by another component (e.g., processor 1202). In some embodiments, I/O interface 1206 may include support for devices attached through various types of peripheral buses, such as a variant of the Peripheral Component Interconnect (PCI) bus standard or the Universal Serial Bus (USB) standard, for example. In some embodiments, the function of I/O interface 1206 may be split into two or more separate components, such as a north bridge and a south bridge, for example. Also, in some embodiments some or all of the functionality of I/O interface 1206, such as an interface to system memory 1204, may be incorporated directly into processor 1202.

Network interface 1210 may be configured to allow data to be exchanged between computer system 1200 and other devices attached to a network 1224 (e.g., carrier or agent devices) or between nodes of computer system 1200. Network 1224 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1210 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1212 may, in some embodiments, include one or more display terminals, keyboards, keypads, touchpads, scanning devices, voice or optical recognition devices, or any other devices suitable for entering or accessing data by one or more computer systems 1200. Multiple input/output devices 1212 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1210.

Those skilled in the art will appreciate that computer system 1200 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
an optical assembly having one or more lens defining an optical axis;
an image sensor;
an actuator assembly to move the image sensor relative to the optical assembly; and
a flexure that suspends the image sensor from a stationary structure of the camera and that allows motion of the image sensor enabled by the actuator assembly;
wherein the actuator assembly comprises:
a stationary magnet,
a transversal coil that, when receiving a magnetic field from the stationary magnet, moves the image sensor in one or more directions orthogonal to the optical axis, and
an axial coil that, when receiving a magnetic field from the stationary magnet, tilts the image sensor in one or more directions about an axis orthogonal to the optical axis.

2. The camera of claim 1, wherein the optical assembly comprises a static optical assembly.

3. The camera of claim 1, wherein a holder fixedly attached to the stationary structure of the camera retains the stationary magnet.

4. The camera of claim 1, wherein the transversal coil and the axial coil are retained by a carrier fixedly coupled with the image sensor.

5. The camera of claim 1, wherein the actuator assembly comprises:
a plurality of stationary magnets;
a plurality of transversal coils; and
a plurality of axial coils, wherein:
a respective transversal coil of the plurality of transversal coils, when receiving a magnetic field from a respective stationary magnet of the plurality of stationary magnets, moves the image sensor in one or more directions orthogonal to the optical axis, and
a respective axial coil of the plurality of axial coils, when receiving a magnetic field from the respective stationary magnet, tilts the image sensor in one or more directions about an axis orthogonal to the optical axis.

6. The camera of claim 5, wherein the actuator assembly is configured to:
move the image sensor along the optical axis;
move the image sensor along a first direction orthogonal to the optical axis;
move the image sensor along a second direction orthogonal to the optical axis and orthogonal to the first direction;
tilt the image sensor about the first direction; and
tilt the image sensor about the second direction.

7. The camera of claim 5, wherein a position sensor is located proximate respective axial coils of the plurality of axial coils, and wherein a position sensor is located proximate at least two respective transversal coils of the plurality of transversal coils.

8. A device, comprising:
one or more processors;
memory storing program instructions executable by the one or more processors to control operation of a camera; and
the camera comprising:
an optical assembly having one or more lenses defining an optical axis;
an image sensor;
an actuator assembly to move the image sensor relative to the optical assembly; and
a flexure that suspends the image sensor from a stationary structure of the camera and that allows motion of the image sensor enabled by the actuator assembly;
wherein the actuator assembly comprises:
a stationary magnet,
a transversal coil that, when receiving a magnetic field from the stationary magnet, moves the image sensor in one or more directions orthogonal to the optical axis, and
an axial coil that, when receiving a magnetic field from the stationary magnet, tilts the image sensor in one or more directions about an axis orthogonal to the optical axis.

9. The device of claim 8, wherein the optical assembly comprises a static optical assembly.

10. The device of claim 8, wherein a holder fixedly attached to the stationary structure of the camera retains the stationary magnet.

11. The device of claim 8, wherein the transversal coil and the axial coil are retained by a carrier fixedly coupled with the image sensor.

12. The device of claim 8, wherein the actuator assembly comprises:
a plurality of stationary magnets;
a plurality of transversal coils; and
a plurality of axial coils, wherein:
a respective transversal coil of the plurality of transversal coils, when receiving a magnetic field from a respective stationary magnet of the plurality of stationary magnets, moves the image sensor in one or more directions orthogonal to the optical axis, and
a respective axial coil of the plurality of axial coils, when receiving a magnetic field from the respective stationary magnet, tilts the image sensor in one or more directions about an axis orthogonal to the optical axis.

13. The device of claim 12, wherein the actuator assembly is configured to:
move the image sensor along the optical axis;
move the image sensor along a first direction orthogonal to the optical axis;
move the image sensor along a second direction orthogonal to the optical axis and orthogonal to the first direction;
tilt the image sensor about the first direction; and
tilt the image sensor about the second direction.

14. The device of claim 12, wherein a position sensor is located proximate respective axial coils of the plurality of axial coils, and wherein a position sensor is located proximate at least two respective transversal coils of the plurality of transversal coils.

15. An actuator assembly for a camera module, comprising:

a stationary magnet;

a transversal coil that, when receiving a magnetic field from the stationary magnet, moves an image sensor in one or more directions orthogonal to an optical axis of the camera module; and an axial coil that, when receiving a magnetic field from the stationary magnet, tilts the image sensor in one or more directions about an axis orthogonal to the optical axis.

16. The actuator assembly of claim 15, wherein the transversal coil moves the image sensor relative to at least a stationary optical assembly of the camera module, and wherein the axial coil tilts the image sensor relative to at least the stationary optical assembly.

17. The actuator assembly of claim 15, wherein the transversal coil and the axial coil are retained by a carrier fixedly coupled with the image sensor.

18. The actuator assembly of claim 15, further comprising:

a plurality of stationary magnets;

a plurality of transversal coils; and a plurality of axial coils, wherein:

a respective transversal coil of the plurality of transversal coils, when receiving a magnetic field from a respective stationary magnet of the plurality of stationary magnets, moves the image sensor in one or more directions orthogonal to the optical axis, and a respective axial coil of the plurality of axial coils, when receiving a magnetic field from the respective stationary magnet, tilts the image sensor in one or more directions about an axis orthogonal to the optical axis.

19. The actuator assembly of claim 18, wherein the actuator assembly is configured to:

move the image sensor along the optical axis;

move the image sensor along a first direction orthogonal to the optical axis;

move the image sensor along a second direction orthogonal to the optical axis and orthogonal to the first direction;

tilt the image sensor about the first direction; and tilt the image sensor about the second direction.

20. The actuator assembly of claim 18, wherein a position sensor is located proximate respective axial coils of the plurality of axial coils, and wherein a position sensor is located proximate at least two respective transversal coils of the plurality of transversal coils.

* * * * *